United States Patent [19]

Parsons

[11] Patent Number: 4,486,853

[45] Date of Patent: Dec. 4, 1984

[54] APPARATUS FOR RECEIVING AND DISPLAYING CONTINUOUSLY UPDATED DATA

[75] Inventor: Frederick G. Parsons, Arlington, Va.

[73] Assignee: Telemet American, Inc., Alexandria, Va.

[21] Appl. No.: 249,830

[22] Filed: Apr. 1, 1981

[51] Int. Cl.³ .............................................. G06F 7/00
[52] U.S. Cl. ...................................................... 364/900
[58] Field of Search ............... 235/454, 380, 381, 382; 371/49; 364/200, 900; 340/825.26, 142; 179/2 DP; 370/71

[56] References Cited

U.S. PATENT DOCUMENTS

| | | | |
|---|---|---|---|
| 3,387,268 | 6/1968 | Epstein | 340/825.26 |
| 3,478,169 | 2/1965 | Saito | 381/14 |
| 3,611,294 | 10/1971 | O'Neill | 340/142 |
| 3,679,832 | 7/1972 | Halpern | 381/14 |
| 3,716,835 | 2/1973 | Weinberg | 340/825.26 |
| 3,976,840 | 8/1976 | Cleveland et al. | 179/2 DP |
| 3,999,042 | 12/1976 | Silverman et al. | 235/382 |
| 4,048,619 | 9/1977 | Forman et al. | 370/71 |
| 4,064,490 | 12/1979 | Nagel | 364/200 |
| 4,066,910 | 1/1978 | Swift | 235/454 |
| 4,068,095 | 1/1978 | Ghormley | 179/2 DP |
| 4,112,369 | 9/1978 | Forman et al. | 370/71 |
| 4,128,874 | 12/1978 | Pertl et al. | 364/200 |
| 4,138,735 | 2/1979 | Allocca et al. | 364/900 |
| 4,150,781 | 4/1979 | Silverman et al. | 235/382 |
| 4,247,759 | 1/1981 | Yuris et al. | 235/381 |

*Primary Examiner*—Charles E. Atkinson
*Assistant Examiner*—Michael R. Fleming
*Attorney, Agent, or Firm*—Mason, Fenwick & Lawrence

[57] ABSTRACT

Receiving and displaying apparatus is disclosed for receiving a continuously transmitted stream of encoded data messages, whereby selected of the data messages are stored in an updateable, addressable memory having a plurality of locations, one for each of the selected data messages. Each of the data messages has its unique word identifying the nature of the data message. In particular, the receiving and displaying apparatus includes a temporary storage means wherein each data message and in particular, its identifying word is stored and means for comparing the temporarily stored identifying word with the identifying word of each of the data messages as presently stored within the locations of the addressable memory. The comparing means operates to successively compare the temporarily stored identifying word with the identifying words as stored with each of the plurality of locations and if there is a match, for updating the matched location with the new data message and if a match is not made, to discard that incoming data message.

39 Claims, 23 Drawing Figures

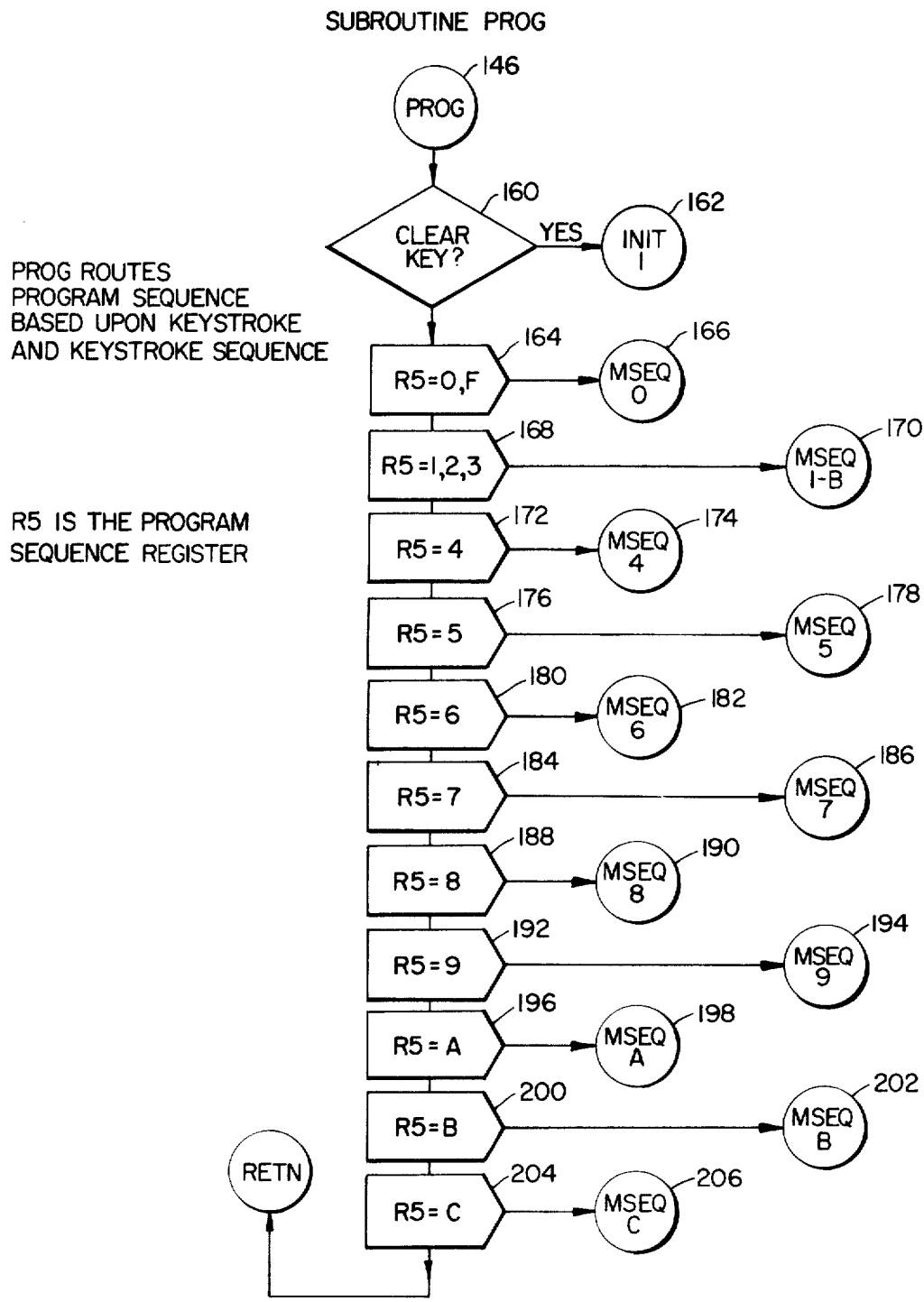

SUBPROGRAMS SEQ5 AND MSEQ6

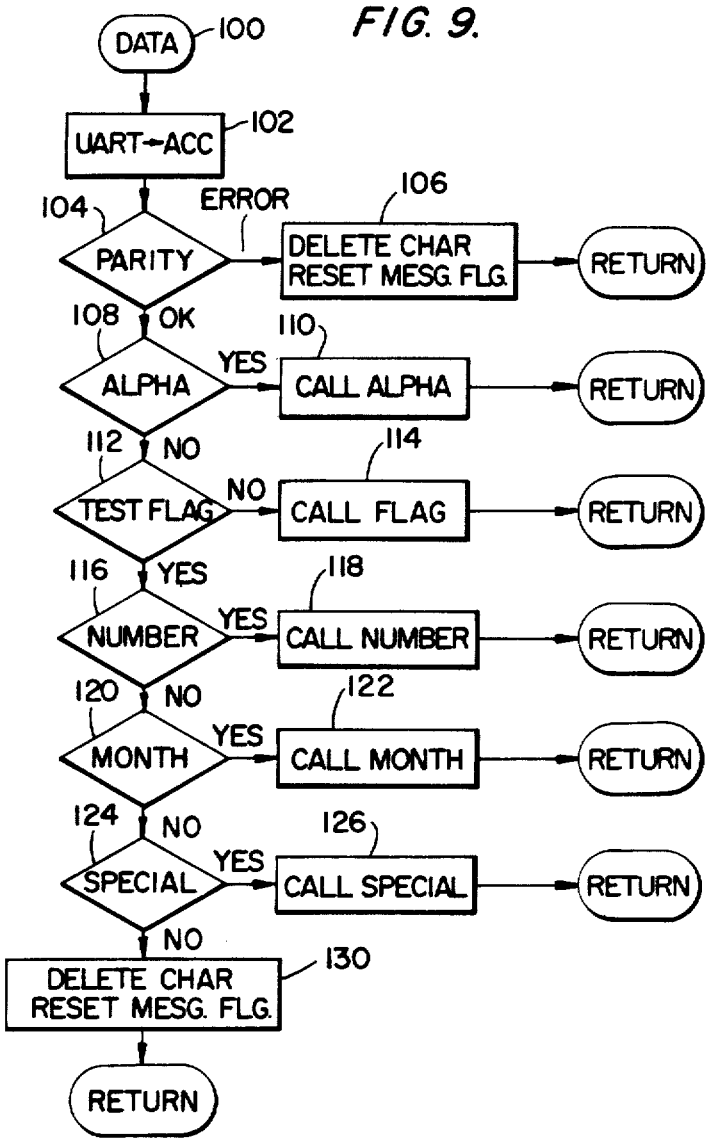

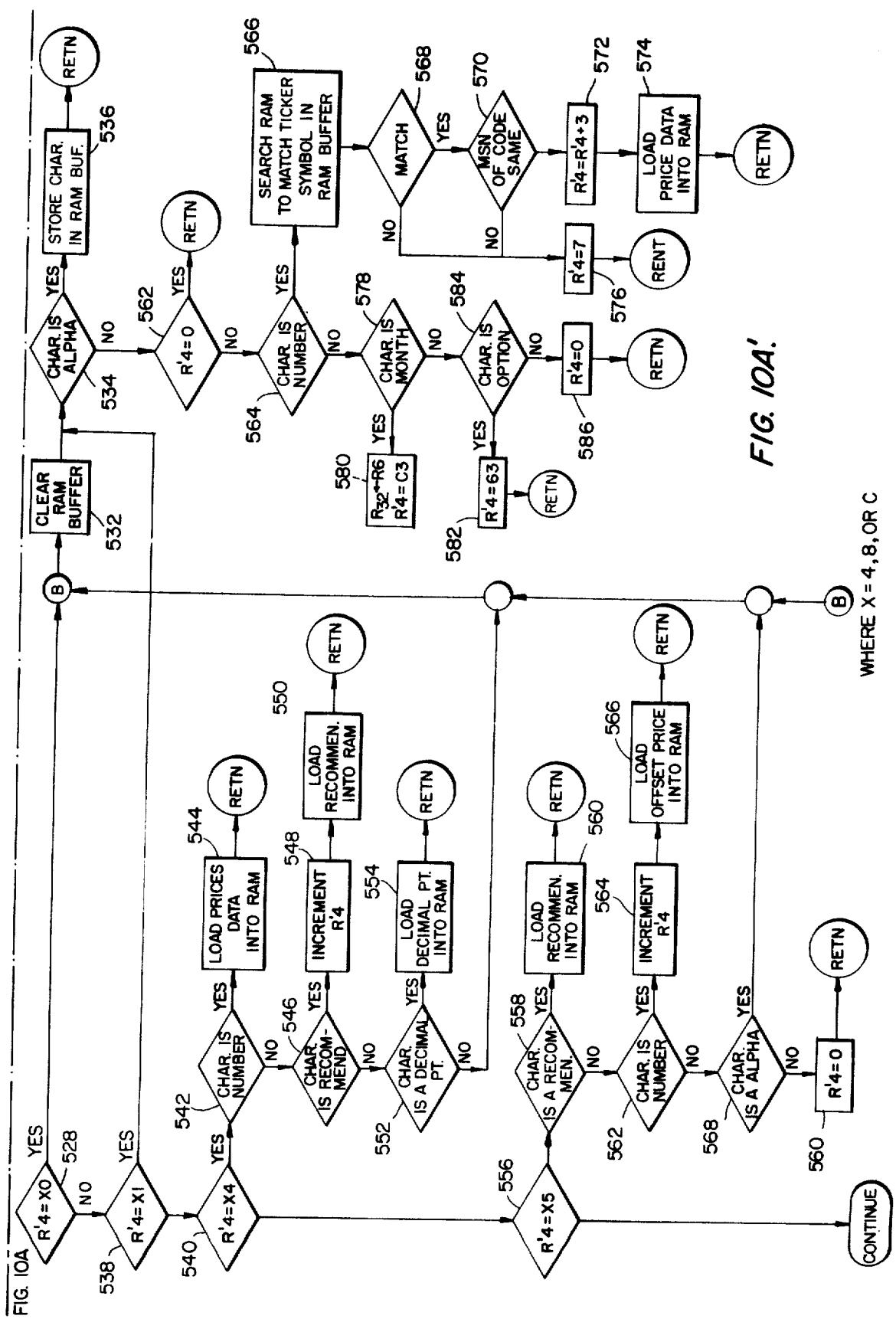

APPARATUS FOR RECEIVING AND DISPLAYING CONTINUOUSLY UPDATED DATA

BACKGROUND AND OBJECTS OF THE INVENTION

Buying and selling securities and other investments typically requires constant attention to prices, news information, and recommendations of large securities firms and investment advisory services. News of changes in recommendations issued by large institutions tend to affect prices within several days of the announcement. Private investors typically have contacted their securities firm or their stock broker for price, news, and recommendations. This method, while satisfactory, was time consuming and sometimes difficult, since stockbrokers typically have many clients to serve, and spend a large portion of their day selling securities rather than brokering information.

Individually, private investors have access to personal quotation devices such as the Marketline terminal, U.S. Pat. No. 3,716,835, (Weinberg et al, 1973). The Marketline system consists of a central processor facility which collects securities information from the exchanges and interfaces this information to a number of terminals via standard telephone lines. The terminals have a cradle for a telephone handset, and a means for coupling data from the handset to display and from the terminal keyboard to the central processor. The subscriber to this system dials a private telephone number and enters, via the keyboard, a password to obtain securities information.

Another patent, U.S. Pat. No. 3,976,840, (Cleveland et al, 1976) describes a similar terminal identified as a portable securities selector system. This terminal provides not only for securities information to be elicited but also for transactions to be automatically executed by an investor from a conventional telephone. Once again, the investor dials a private telephone number and enters via a keyboard, a password to obtain securities information.

Both of these systems suffer from the drawback that the subscriber must be near a telephone. Moreover, in order for the phone not to be busy when a subscriber requests information or wishes to execute transactions, the system must use a large number of telephone lines at its central processing facility. This increases the expense of the service to the subscriber. In addition, the subscriber cannot maintain connection to the service since this will tie-up phone lines and the processor, and be quite expensive to the subscriber.

A number of patents have attempted to solve the problem of telephone connection to the central processor. U.S. Pat. No. 3,387,268, (Epstein, 1968) discloses a "quotation monitoring unit", in which continuously updated stock trading transaction information is transmitted over a communications channel from a central location, so that a plurality of portable radio receivers referred to as "tapewatcher apparatus" respond to transmitted data regarding a "predetermined number of subscriber selected stocks" to display the relevant stock market information. This system suffers from the disadvantage that the system sends "multiplicities of essentially chronologically arranged stock trading transactions" to the owner of the terminal. In this case, the owner would have to continuously monitor the communications channel in order to obtain proper quotations of a security. Moreover, if a security did not trade early in the day, an owner could conceivably be without the information for the better part of the day. In addition, the quotation mointoring unit had no provisions for security, therefore it was difficult to provide subscription services.

An alternative form of the above is shown in U.S. Pat. No. 3,611,294, (O'Neill, 1971). This patent discloses a somewhat similar concept, which specifically refers to continuous transmission or broadcasting of stock market information in encoded form, to be received by a plurality of broadcast receivers, each of which is provided with a "decoding attachment", or a completely self-contained receiver-decoder which transfers subsequently received information to a suitable readout display upon receipt of a predetermined identity message. In this system, each receiver is coded by identification coad wheels to establish an identity coad for a particular stock, and when information is received by AM, FM or PM transmission regarding that stock, a shift register identifies the coad for the particular stock and provides an output pulse producing the display of the message regarding the stock price, etc. However, this system suffers from a number of disadvantages. Due to the design of the decode wheels/decoder attachment, a particular securities price is present at the output (display) only when the decoder wheels are set to that security. Subscribers to this service must wait for the transmission of information on the security of interest before it is displayed. They must wait for a correlation between the identity code for a particular security and the receipt of a predetermined identity message. This wait may be several minutes if a large number of securities are transmitted and private investors are apt to be impatient.

U.S. Pat. No. 4,112,369, (1978) represents a later version of a radio broadcasting system for transmitting, on FM, continuously updated stock data regarding securities and commodities. The "portable receiver terminal" includes a tuned FM receiver and a keyboard for entering a password to identify a particular subscriber. A "keyboard" is generated to decode the received data regarding particular stocks to store the date for future use or to be displayed. The keyword is generated using an identification number stored in the terminal. When a subscriber desires to display broadcast information regarding current stock market prices, etc., or selected stocks, he enters a "unique password" in his keyboard which is combined with the identification number to generate a "keyword" which decodes the received binary data and produces an output display of the stock market data. This system is advantageous in that the identification number stores in the device must be combined with the password entered on the keyboard in order to form the keyword; passwords cannot be shared among subscribers. However, it suffers from the disadvantage that each receiver terminal must have a unique identification number stored in it. These terminals do not lend themselves to mass production and are therefore more expensive to produce than terminals not pre-wired with such numbers. Moreover, passwords and terminals are uniquely connected adding additional complications to inventory control, terminal distribution, and subscription accounting of the service. The subscriber has the added inconvenience of entering his password on the keyboard whenever he turns on the unit to request information.

SUMMARY OF THE INVENTION

It is an object of this invention to receive a stream of encoded data comprising a plurality of data groups and for selectively identifying the data messages to be further processed.

It is a more particular object of this invention to provide a new and novel receiving and displaying apparatus that is capable of storing a limited number of data messages and yet is capable of receiving a stream of a larger number of encoded data messages and for selecting those of particular interest to be stored and subsequently displayed by the apparatus.

It is a particular object of this invention to provide new and novel receiving and displaying apparatus that a user may carry with him/her, and use to receive and display data messages of particular interest to the user, while discarding those data messages that are being continuously transmitted but which are not of interest to the user.

In accordance with these and other objects of the invention, the subject invention comprises apparatus for receiving a continuously transmitted stream of encoded data messages, wherein selected of the data messages are stored in an updateable, addressable memory having a plurality of locations, one for each of the selected messages. Each of the data messages has its unique word identifying the nature of the data message. In particular, the receiving and displaying apparatus includes a temporary storage means wherein each data message and in particular, its identifying word is stored; the temporarily stored identifying word is compared by a comparison means with the identifying word of each of the data messages as presently stored within the locations of the addressable memory. The comparing means operates to successively compare the temporarily stored identifying word with the identifying words as stored with each of the plurality of locations and if there is a match, for updating the matched location with the new data message and if a match is not made, to discard that incoming data message.

In a further aspect of this invention, the receiving and displaying apparatus is adapted to receive an encoder card having a stored manifestation thereon in the form of a keyword that permits the user to gain access to the transmitted stream of data messages. In one embodiment of this invention, it is contemplated that the continuous stream of an encoded data messages is transmitted with a like keyword that is matched to the keyword stored within the decoder card and if a match is made, the receiving and displaying apparatus is enabled to receive and decode the transmitted stream of data messages. In an alternative embodiment, the continuous stream of data messages is transmitted with various bits of each data message reordered; the decoding card includes a data manifestation permitting the reordering or restructuring of the transmitted messages so as to be intelligible to the receiving and displaying apparatus.

In a still further feature of this invention, the decoder cards may illustratively comprise a series of bars and spaces, at least one of which is transmissive or reflective to radiation to be sensed so that the receiving and displaying apparatus may readout from the decoding card the keyword to be stored thereby. In one embodiment, a protective layer is disposed over that layer comprising the spaces and bars, the protective layer being opaque to radiation in the visual range thus rendering the spaces and bars unintelligible. In an alternative embodiment, the spaces and bars are made variously reflective or transmissive, and nonreflective or nontransmission to radiation whereby a distinction between the spaces and bars may be observed.

In a still further feature of this invention, the receiving and displaying apparatus includes a classifier, which comprises an array or set of switches that may be selectively preset to provide a manifestation to be compared with a character contained within the transmitted stream of encoded messages and if a comparison is made, to enable the receiving and storing apparatus to receive the data stream or more specifically, a part of the data stream in the form of a promotional message. In this manner, selected parts of the data stream may be only received by those apparati that have been preset to receive that message.

BRIEF DESCRIPTION OF THE DRAWINGS

These and other objects and advantages of the present invention will become more apparent by referring to the following detailed description and drawings, in which:

FIGS. 8A through 8I are detailed flow diagrams of the PROG routine as generally shown in FIG. 7 for controlling the interpretation of the actuation and sequence of actuation of the keys of the keyboard as shown in FIGS. 2, 3 and 4A; and FIGS. 9, and 10A and 10B show respectively a high-level flow diagram and a lower order flow diagram of the interrupt routine for checking and updating of information as stored within the RAMs of the receiver/display device of this invention in response to the reception of each data character in the interface as shown in FIG. 3.

DETAILED DESCRIPTION OF THE INVENTION

Figure 1:
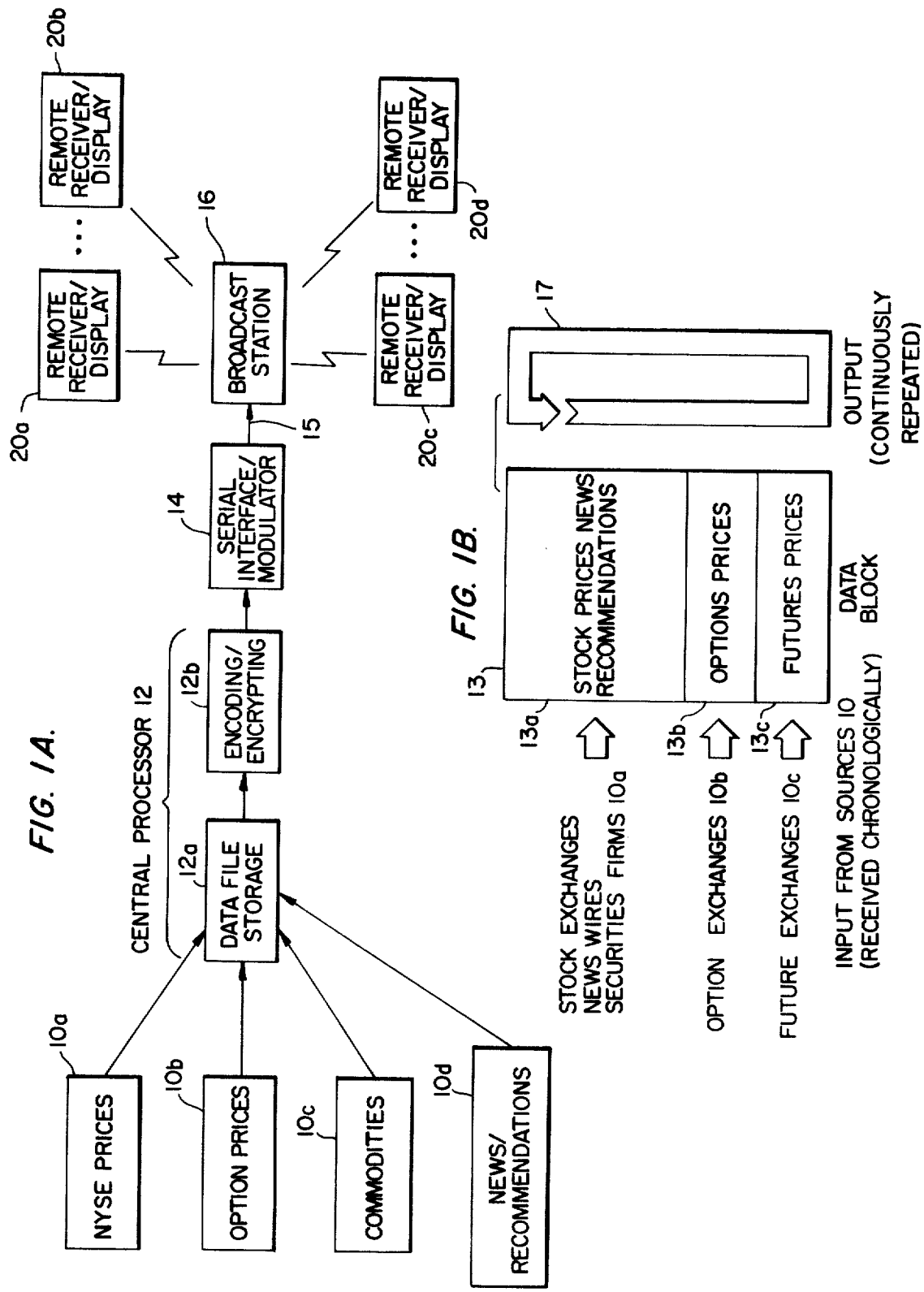
FIGS. 1A and 1B show respectively a functional block diagram of the manner in which data from a plurality of sources are encoded and encrypted to be transmitted to the receiver/display devices of this invention, and a flow diagram of the manner in which data from the plurality of sources as identified in FIG. 1A are assembled and continuously transmitted.

Referring to the drawings, wherein like reference characters designate corresponding parts throughout the several figures, FIG. 1 illustrates the flow of investment information from their primary sources 10 to subscribers in possession of hand-held devices 20 of the present invention for receiving, decoding and displaying the transmitted data, illustratively investment information. Information from the floor of the exchanges and/or one or more securities firm is relayed to a central processor, generally designated by the numeral 12. The sources of data includes as illustratively shown in FIG. 1 a source 10a of information such as last traded of the high and low prices of securities traded on the New York Stock Exchange (NYSE), a source 10a of recommendations on a variety of investment vehicles, such as stocks, options, and futures, a source 10b of option prices and a source 10c of commodity prices. This information is stored in data file of memory 12a and encoded and encrypted by apparatus 12b in a data format which allows the data to be compressed. The data so compressed can be sent more rapidly than it normally would using standard communication encoding. Next, the encrypted and encoded data is applied to a serial interface/modulator 14 before being transmitted over a transmission line 15 in a serial fashion to a broadcast station 16. Illustratively, the data storage file 12a, the encoding and encrypting circuit 12b, and serial interface/modulator 14 may take the form of a Digital Equipment Corporation (DEC) PDP-11/34A processor with DEC's 8-16 line asynchronous serial interface model DZ-11 multiplex serial communication interface and a frequency shift keying (FSK) modulator as manufactured by Western Electric Company under their designation No. 202. Illustratively, interface/modulator 14 frequency shift keys a carrier on the transmission line 15 illustratively taking the form of a C2 conditioned private line. The model 202 modulator is capable of frequency shift keying at a frequency in the range of 1,100 and 2200 Hz, thus providing a baud rate in the order of 1800 bps on the private C2 conditioned transmission line and at a baud rate of 1200 bps on switched (dial-up) connections and unconditioned lines. Though not shown in FIG. 1A, tuned filters at 1100 and 2200 Hz are used illustratively to intercouple the transmission line 15 with its interface/modulator 14 and with the broadcast 16 to eliminate noise likely to be present on the transmission line 15. It is contemplated that level control would not be necessary since such private transmission lines and noise levels are relatively constant compared to their switched counterparts. As is well known in the art, the transmission line 15, if implemented as a private line, would logically include a four wire line permitting independent paths between the interface/modulator 14 and the broadcast station 16. Thus, the path going from the broadcast station 16 to the interface/modulator 14 include market information and news features either direct from a broker service or from the New York Stock Exchange. By contrast the path from the broadcast station 16 to the interface/modulator 14, may be operative at a baud rate in the order of 300 to 1800 bps and would include the information to be broadcast to and received by the broadcast station 16. Though not shown in the drawings, the broadcast station 16 includes a demodulator, illustratively taking the form of a Model 202, as by Western Electric Co., for demodulating the signal transmitted over the transmission line 15. In turn, the broadcast station 16 transmits the demodulated signal by frequency shift keying (FSK). As illustrated in FIG. 1A, the security data as broadcast from the broadcast station 16 are received by each of the plurality of remote receiver/display devices 20.

As illustrated in FIG. 1B, data is transmitted from the broadcast station 16 in serial fashion to each of the receiver/display devices 20 in continuous fashion. The data is taken from the various sources 10 as shown in FIG. 1A and is assembled into a message block 13 comprised of the stock prices disposed in a first message 13a in a second message 13b and future prices arranged in a third message 13c. In particular, each message of the message block 13 comprises a series of data submessages, each submessage describing one security, whose type may be a stock, stock option or commodity future, followed by a submessage describing another security. Thus, the message block 13 illustratively compiles a string of submessages divided into three message types 13a, b, and c as shown in FIG. 1B. As will be explained below, it is contemplated that a promotional message (not shown in FIG. 1B) may be disposed as the first message and serve to faciliate the decoding of the entire message block 13. The message block 13 is repeatedly transmitted as a loop by the broadcast station 16, while at the same time the data as derived from the sources 10 is applied to the data file storage 12a to update the information contained in the message block 13. Thus, as prices change upon the exchange of interest, the changed price information is inserted into the message block 13 and thereafter rebroadcast as the loop 17 to provide a subscriber operating his receiver/display 20 with current information. Thus, continuous repetition and updating has the advantage that the subscriber need not operate his receiver/display 20 continuously to receive timely investment information. Instead, a subscriber may activate at his discretion his receiver/display device 20, wait no more than several minutes, and obtain any high, low, last trade price, or any other information on his investments.

As will be described, the receiver/display device 20 of this invention is capable of being selectively programmed to process only those securities in which its subscriber is interested. More specifically, the receiver/display device 20 is capable of extracting from the repetitously transmitted loop 17 of message blocks 13, the data submessages corresponding to those securities which the subscriber has programmed his device 20 to receive and display. The remaining securities in which the subscriber has no interest are merely ignored and thus a subscriber is spared tedious waiting while the information of interest to him is being unnecessarily displayed.

It is a significant feature of this invention to reduce the average time to access any of the information as obtained from the stock exchanges, option exchanges or future exchanges. The access time is dependent upon the format of the data words in which the information identifying the securities, options an futures is set out as well as the number of such stocks, options and commodities that are transmitted in each block 13.

In an illustrative embodiment of this invention, the stock prices as shown in the message 13a may be encoded by the apparatus 12b as shown in FIG. 1A in the following manner. The code proposed is an 8 bit code plus parity bit and one start and one stop bit, making 11 bits per character. Using such encoded characters, security data may illustratively include high, low and last quotations on approximately 1000 NYSE securities. If news has occurred, a special character is sent which sets a news flag. Special characters also transmit data regarding broker recommendations. The format of the stock price message 13a of the block 13 may illustratively include:

$$AB \ldots I X_1 X_2 \eta \xi \nu \gamma Y_1 Y_2 Y_3$$

where
- AB . . . I is up to five upper case, set of alpha characters which denote the security's ticker symbol
- $X_1 X_2$ are two bytes of numeric code which contain the latest trade price. The $X_2$ LSN denotes the fraction, if any in 16ths
- $\eta \xi \nu \gamma$ one or more special character bytes coded to set flags and provide security recommendations of the broker and/or investment advisor
- $Y_1 Y_2 Y_3$ are three bytes which contain the difference between the last price and high, and the difference between the last price and the low for the trading day.

The ticker symbols AB . . . I for stocks are upper case alpha characters and will correspond to ticker symbols on the exchanges. Each alpha character may take the form of a one byte code. The last price $X_1 X_2$ is encoded into two bytes immediately following the ticker symbols. With two bytes, last trade price data from 0 through 999 15/16 can be transmitted. Last trades over 999 15/16 may be coded by dropping the 1000s place (e.g. 1101⅛ coded as 101⅛, 1112½ as 112½ etc). The two bytes may be coded as nibbles, each nibble read as a power of ten, save the last one which will be read as 16ths. The data in the two bytes is decoded by reading the second byte ($X_2$) as a number between 0 and 9 (MSN) and the numerator of a fraction 0 to 15 (LSN). The first byte $X_1$ is read as the tens and hundreds power. In this manner, the MSN of byte 1 becomes the 100s place, the LSN of byte 1 the tens place, the MSN of byte 2 the 1s place and the LSN of byte 2 the fraction 0/16 through 15/16. Most of the time on the NYSE, the fractions are quoted in 8ths, however once in a while 16ths are used. Options are quoted in 16ths more frequently.

The special characters $\eta \xi \nu \gamma$ are used to give the investor information concerning recommendations on the equity and news alert, if news has occurred on the security. The first character ($\eta$) is the news alert character and is also used as a limiter between the last price and the high and low offsets. $A7_{16}$ may be used to indicate news, on a security. $A8_{16}$ may be used to indicate no news, $A9_{16}$ may be used to indicate no trades on the security. The second, third and fourth special characters refer to the broker or investment adviser, and their recommendations for the security. For example, each of the four special characters corresponds to:
- $\eta$ = news/no news byte (A7, A8 or A9)
- $\xi$ = vendor code for recommendation
- $\nu$ = long term gains recommendation
- $\gamma$ = income recommendation The final three bytes of a given stock submessage give the high and low offset from the last price data $X_1 X_2$. The offsets are added to and subtracted from the last price part of the stock message to form the high and low for the day. There are several ways that this information could be encoded in three bytes. The principal criterion used to judge the most acceptable method would be how easily it could be decoded in the display. In the high price offset, two nibbles could represent the 1s and 10s place in the offset and one nibble represents the fractional offset (in 16ths). the low offset is treated similarly. As an illustrative example of the code, let the first byte be the 10s and ones representative of high offset and the MSN of the second byte be the fraction associated with this offset. The LSN of the second byte is the fraction associated with the low offset and the third byte is the 10s and those representative of the low offset. The high/low information may be encoded as follows:

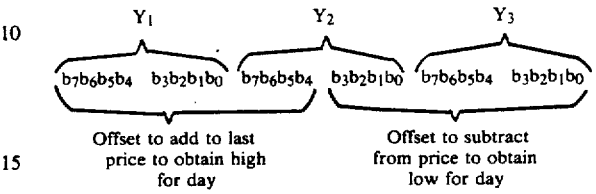

Offset to add to last price to obtain high for day     Offset to subtract from price to obtain low for day Using the encoding scheme for the securities as described above, the average time to access an arbitrarily selected security may be established as follows. There are several thousand equity securities traded on the NYSE, AMEX, Philadelphia, and OTC exchanges. To estimate cycle time (the time to send the stock message for all securities corresponding to block 13a once), 1000 prominent NYSE stocks will form the basic message length. Options and commodities will add to this cycle time; their contributions will be estimated later. The standard ticker code is 3 alpha symbols to represent a security, although some stocks have fewer. Adding the price and special characters as will be explained below to the message length gives 12 characters per stock (132 bits per stock) for a total of 132,000 bits per cycle for 1000 stocks. The following table shows the relationship between baud rate of data transmission, cycle time and average access time based on the above baseline of 1000 stocks:

| | CYCLE AND ACCESS TIMES 1000 STOCKS | |
|---|---|---|
| BAUD RATE | CYCLE TIME (min:sec) | ACCESS TIME* (min:sec) |
| 600 | 3:39 | 1:49 |
| 1200 | 1:49 | :54 |
| 1800 | 1:13 | :36 |

An option is the right to buy (or sell) a stock at a given price for some definite time period. There are several exchanges which currently sell "calls", which are the rights to buy a stock. These include the Chicago Board of Options (CBO), the American Stock Exchange Options (AMEXO), and the Philadelphia Options Exchange (POE). In the near future, these and other exchanges are expected to offer "puts" for sale, the right to sell a security at a given price for some definite period. The data structure of the option message 13b adapted to be transmitted to the devices 20 must preserve flexibility to add to and subtract from its options list and to incorporate puts as an option message. Currently there are about 96 stocks with various call options on the CBO, and 64 stocks on the AMEXO.

Two formats are suggested for option prices, each could be used with the receiver/display device 20 of this invention. These could be: (1) Format 1: addendum to stock submessage and (2) Format 2: separate message similar to stock submessage. The first format minimizes redundant characters but implies that the underlying security be quoted. A more flexible approach, with a slightly longer cycle time (less than 10 seconds), uses the second format. The underlying security need not be quoted along with the option, and new options can be carried on the data stream at will or added intermittently throughout a trading day. The format for the option message 13b would be:

$$ABCI\alpha SiX_{1j}X_{2j}\eta Y_{1i}Y_{2i}Y_{3j}jX_{1j}X_{2j}\eta Y_{1j}Y_{2j}.$$
$$jY_{3j}kX_{1k}X_{2k}\eta Y_{1k}Y_{2k}Y_{3k}$$

where each letter represents a byte and
- ABCI is the ticker symbol for the option
- $\alpha$ is a special character to indicate option, its type (put or call) and exchange
- S is a byte representing the base striking price
- jkl are bytes representing months in the future when the option expires. The month codings for options extend for about 6 months.
- $X_{1j}X_{2j}$ are bytes representing last trades for options prices in month j. Two bytes represent the price range between 999 15/16 and 0.
- $\eta$ represents a limiter byte, a special character for news alerts or recommendations.
- $Y_{1j}Y_{2j}Y_{3j}$ are 3 bytes which contain the difference between the last price and high, and the last price and low for the trading day for the option that expires in month j.

The ticker symbol ABCI for the option is an amended stock ticker symbol. The amended character (I) may differentiate among puts and calls, and options traded on different exchanges (some stocks have options traded on more than one exchange):
- I = A AMEXO call
- I = C CBO call
- I = B AMEXO put (when available)
- I = D CBO put (when available)

The option special character follows the ticker symbol (a group of alpha characters), and codes the options.

The option striking price S is that price at which the stock can be bought (call) or sold (put) over the predetermined option period. These prices normally range from 10 to about 100. Options striking price sometimes exceed 100. The price S will denote the striking price which is traded for an option. The 4 bits of the LSN will denote the 1s place. An option with a striking price of $15_{10}$ would simply be coded $15_{16}$ etc. In the rare case the option striking price was above 100, the 100s place would be dropped.

Options are typically offered with three different expiration dates and several different striking prices. For example, there may be IBM 60s, IBM 65s, and IBM 70s; each of these offered with expiration dates of perhaps June, August, and September. Since options with new striking prices are offered as stocks rise or decline, the encoding schemes has the flexibility to add or delete options with differing striking prices.

Matrix of option prices jkl are defined when the months for these options are transmitted. There are three months for each option and a special 8 bit character is reserved for each. Prices for a given striking price follow the byte that indicates the month in which the option expires.

The last trade prices $X_{1m}X_{2m}$ for options are encoded in a manner identical to that of stocks. A last trade price for a given option (given stock, striking price and expiration month) takes two bytes. Three nibbles are associated with the 100s, 10s, and 1s place (right justified) and one nibble with the fraction (in 16ths). The special character $\eta$ (a news alert character) is used as a delimiter to separate 1st prices from highs and lows, just as it was used in the stock message. The high low offsets are sent in a manner identical to that of stocks described above.

The access time for an arbitrarily selected option is established upon the following consideration. Currently there are 96 different stocks with options on the CBO and 64 on the AMEX Option Exchanges. There are, on average, 3.5 striking prices per stock and each has 3 expiration dates. On average for each options message, there are:

| |
|---|
| 3 alpha characters |
| 1 special character (indicating option) |
| 1 striking price byte |
| 3 month bytes |
| 2 bytes for last prices (without high and low) |
| 10 total bytes for each option message |

This represents 110 bits per message. With an average of 3.5 striking prices per stock option, this represents 385 bits per stock. The following table shows the relationship between baud rate and cycle/average access time in order to transmit CBO and AMEX stock options:

| CYCLE AND ACCESS TIMES: OPTIONS | | | |
|---|---|---|---|
| EXCHANGE | BAUD RATE | CYCLE TIME (sec) | ACCESS TIME (sec) |
| CBO | 600 | 62 | 31 |
| | 1200 | 31 | 15 |
| | 1800 | 20 | 10 |
| AMO | 600 | 41 | 20 |
| | 1200 | 20 | 10 |
| | 1800 | 14 | 7 |

The futures message 13c illustratively has the following format:

$$ABCjR_jX_{1j}\ldots X_{4j}\eta Y_{1jh}Y_{2jh}Y_{3jh}Y_{1j1}Y_{2j1}Y_{3j1}kR_kX_{1k}X_{2k}X_{3k}X_{4k}$$
$$\eta Y_{1kh}Y_{2kh}Y_{3kh}Y_{1k1}Y_{2k1}Y_{3k1}mR_mX_{1m}X_{2m}X_{3m}X_{4m}\eta Y_{1mh}$$
$$Y_{2mh}Y_{3mh}Y_{1m1}Y_{2m1}Y_{3m1}\ldots$$

where
- ABC   is an up to 3 byte set of upper case alpha characters which denote the future ticker symbol
- jkm   are the month codes associated with the futures offered for sale
- $R_j$   is the byte with the year code associated with the month code, eg 80, 81, 92
- $X_{1j}\ldots$   are up to 4 bytes reserved for the
- $X_{4j}$   last prices associated with the jth month of a future ABC
- $\eta$   is a special news character either $AE_{16}$ or $AF_{16}$ (news or no news)
- $Y_{1jh}\ldots$   are the bytes reserved to transmit
- $Y_{3jh}$   deviations to compute the high for the day for future ABC in month j
- $Y_{1j1}\ldots$   are the bytes reserved to transmit
- $Y_{3j1}$   deviations for the future ABC in month j Each future is coded by up to 4 alpha characters. Each grouping of alpha characters represents a different future on a different exchange.

The month codes jkm are the same as those used in the options messages as described above. These bytes separate trades in different months; when combined with the year byte, they uniquely define the delivery date of the commodity.

The year byte $R_j$ is combined with the month byte to form the delivery date for the future ABC. The byte is read as two nibbles. The MSN is the 10s place and the LSN is the 1s place of the delivery year. Future contract delivery dates extend into 1982 at present (Feb. 1980). In the future, these dates will extend into 1983, 84, etc. As an example of the coding, Jan. 81 Sugar would be:

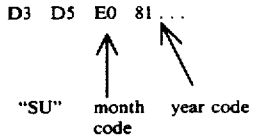

```
D3  D5  E0  81 . . .

"SU"  month  year code
      code
```

The last trade prices $X_{1j} \ldots X_{4j}$ are coded into up to 4 bytes. These bytes would contain a decimal point (1 byte) and up to 6 characters of price information code as nibbles. For example, the last price could be coded as: $X_1=04, X_2=16, X_3=CO, X_4=75$ indicating a price of 416¼. These bytes would immediately follow the month and year data.

The special character byte $\eta$ is used as a delimiter between last price data and high low data. It also indicates the presence (A7) or the absence (A8) of news on the given future with the expiration date associated with the month year bytes or (A9) the absence of trades on the future.

The high and low quotations for the day are encoded in bytes following the special character. Three bytes are encoded as the offset between the last price (X's) and the high; three bytes are encoded as the offset between the 1st price and the low. Each byte is encoded as either a decimal character or as two decimal digits. For example, if wheat were priced at 416, and the high were 420½ and the low were 414¼, the offset for the high would be 04 CO 50, and the low would be 0 CO 75.

Cycle and access times are established for futures based upon the following considerations. Currently there are some 29 popular futures contracts on various exchanges in the U.S. and Canada. On average, the futures have about 7.5 different expiration months each. Therefore the total number of bytes transmitted per future contract is approximately:

|    |        |                              |
|----|--------|------------------------------|
|    | 3      | future identifier ABC        |
|    | 7.5    | month bytes jk . . . m       |
|    | 7.5    | year bytes                   |
|    | 30     | last price bytes             |
|    | 7.5    | special news characters      |
|    | 45     | high low offset characters   |
|    | 100.5  | total bytes/message          |
| or | 1105.5 | total bits/message           |

The following table shows the relationship between baud rate and cycle/average access time in order to present the 29 futures:

| CYCLE AND ACCESS TIMES: FUTURES | | |
|---|---|---|
| BAUD RATE | CYCLE TIME (sec) | AVERAGE ACCESS TIME (sec) |
| 600 | 53 | 27 |
| 1200 | 27 | 13 |
| 1800 | 18 | 9 |

Thus, if it is desired to transmit an entire message block 13 including stock message 13a, option message 13b and future message 13c, average access times and cycle for a selected piece of data, i.e. a stock price, option or future price may be determined from the following chart:

| | AVERAGE ACCESS TIMES | | | | |
|---|---|---|---|---|---|
| | | OPTIONS | | | |
| BAUD RATE | STOCKS (min:sec) | CBO (sec) | AMO (sec) | FUTURES (sec) | TOTALS (min:sec) |
| 600 | 1:49 | 31 | 20 | 27 | 3:07 |
| 1200 | 1:54 | 15 | 10 | 13 | 1:33 |
| 1800 | :36 | 10 | 7 | 9 | 1:02 |

Figure 2:
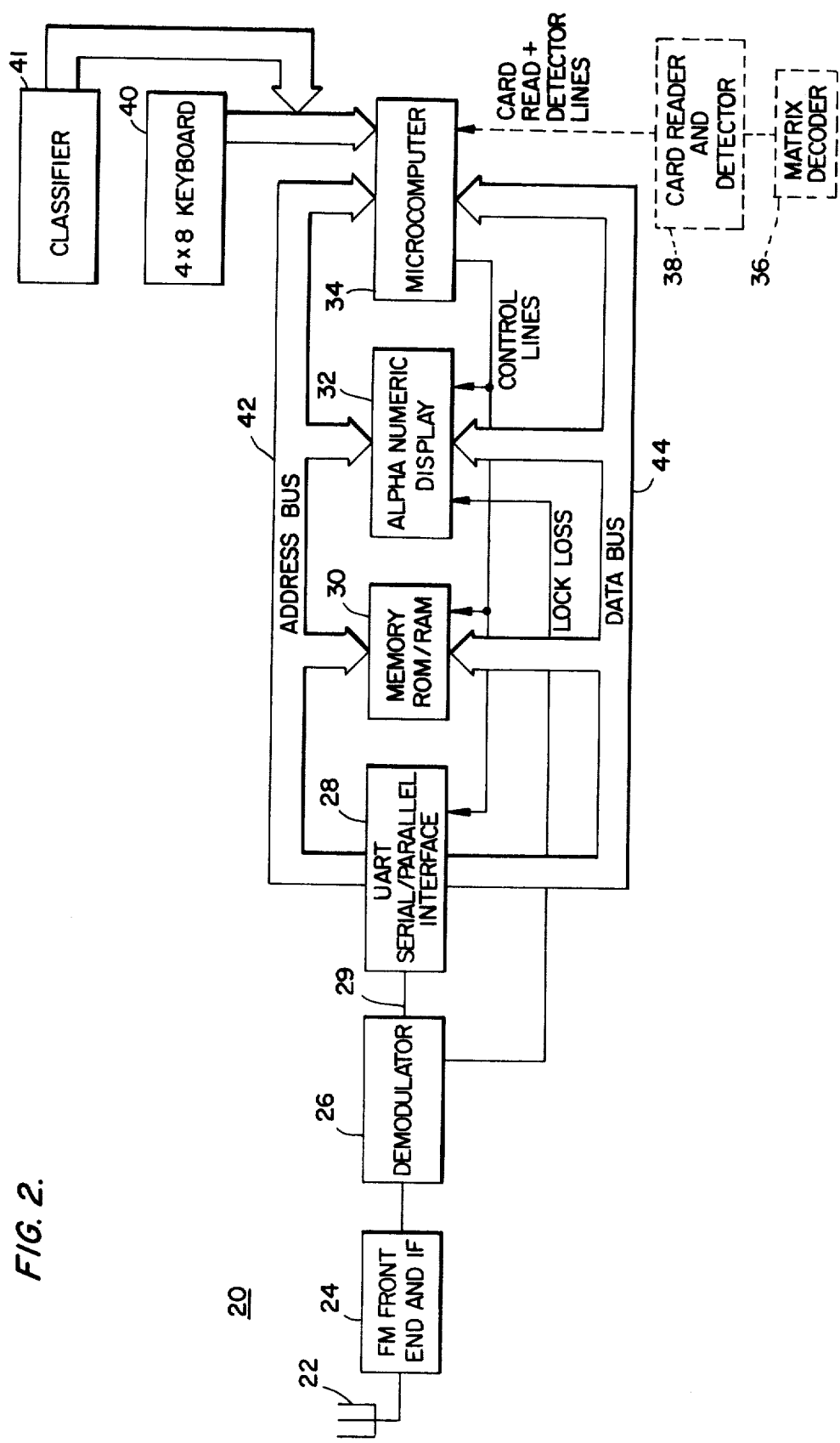
FIG. 2 is a functional block diagram of the receiver/display device in accordance of the teachings of this invention.

The remote receiver/display device 20 shown as a single block in FIG. 1A is illustrated in greater detail by the functional block diagram of FIG. 2, wherein the frequency modulated signals as transmitted from the broadcast station 16 are detected and applied by antenna 22 to a conventional FM front end IF amplifier 24 having conventional RF and IF stages to provide a signal to a demodulator 26 taking the form of a phase lock loop circuit, which processes frequency shift key signals as broadcast into 0 and 1 digital signals, to be in turn applied to a serial/parallel interface 28. In an illustrative embodiment of this invention, the FM front end and IF amplifier 24 comprise an RF amplifier primarily comprised of a dual gate FET used to amplify the received RF signal and apply it to a local oscillator to supply a standard 10.7 MHz frequency signal to a mixer. The mixer is comprised of another dual gate FET that is used to down convert the input, high frequency RF signal to 10.7 MHz. The output of the mixer is applied to an IF amplifier comprised of an NPN silicon transistor to provide the desired amplification, as well as a series of crystal filters and tuned circuits which provide filtering and impedence matching functions. The outputs of the IF amplifiers is applied to a demodulator that is used to demodulate the composite FM audio signal. Finally, an audio tone phase lock detector is used to detect the demodulated audio signals and convert these to logic level signals of zeros and one to provide the data stream to be input to the interface 28. The interface 28 converts the serially applied input of 0s and 1s into 8 parallel outputs to be applied to the data bus 44.

Figure 4A:
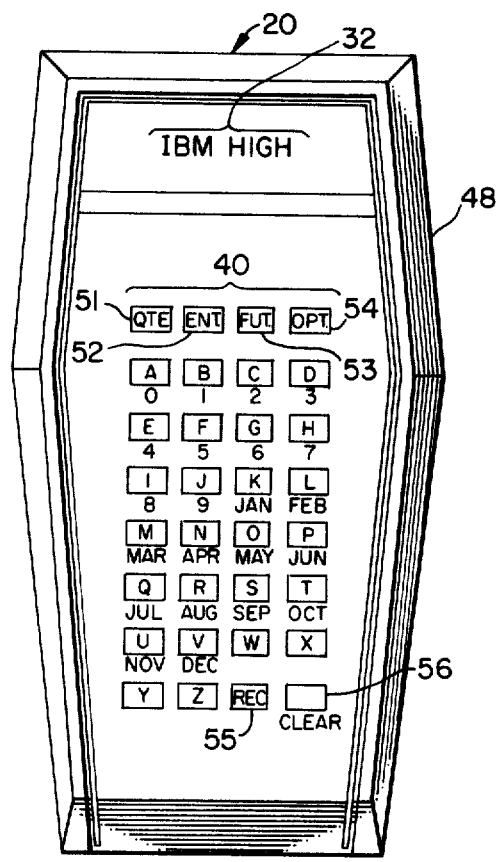
FIGS. 4A and 4B are respectively a plan view of the housing for the receiver/display device as shown in FIGS. 2 and 3 including the keyboard configuration, and a sideview thereof.
Figure 5A:
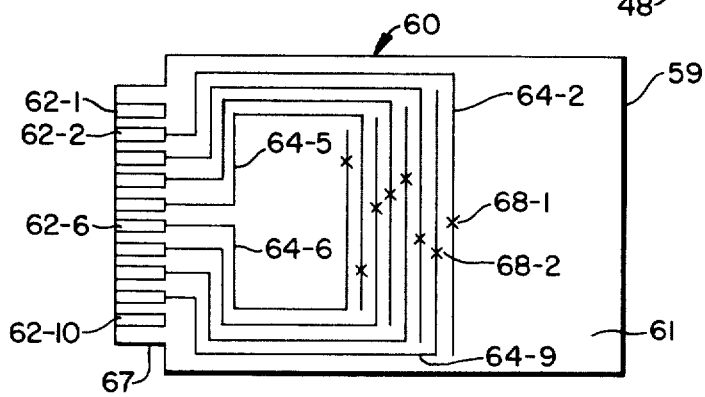
FIGS. 5A and 5B are plan views of opposite sides of a matrix de-encryption card to be inserted within the housing of the receiver/display device as shown in FIG. 4A to permit de-encryption of the transmitted message.
Figure 5B:
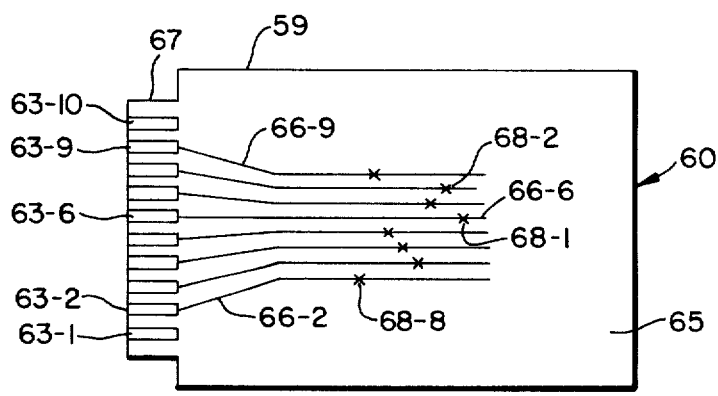
Figure 6A:
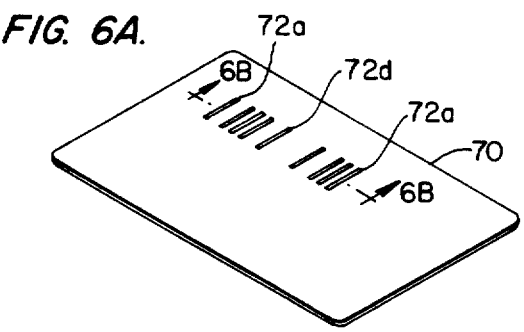
FIGS. 6A and 6B are respectively a perspective view and a cross-sectional view of a further embodiment of a de-encryption card to be used in conjunction with the receiver/display device of this invention.
Figure 6B:
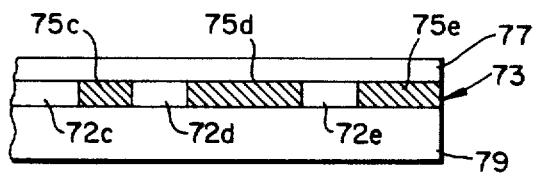

The matrix decoder 36 block maps a word in parallel form in accordance with an 8 dimentional unit vector as established by a matrix card 60 as shown in FIGS. 5A and 5B and to be described in detail below. As will be explained, the matrix card 60 is disposed within a slot 50 within the housing 48 of the receiver/display device 20. The card 60 determines the 8-dimentional unit vector by which the parallel, encrypted input data of 8 bits is converted to a de-encrypted word of 8 parallel bits and serially transmitted via the card read lines to a microcomputer 34 for future processing in accordance with the instructions of a set of programs and subroutines as stored within a memory 30, illustratively taking the form of a read-only-memory (ROM). As will be explained in greater detail, the microcomputer 34 includes input/output ports that scan a keyboard 40 for data input by the operator. The keyboard 40 is illustrated more specifically in FIG. 4a. In addition, the microcomputer 34 outputs selected data in accordance with the keys selectively actuated by the operator upon the keyboard 40 to display data upon an alpha/numeric display 32. An alternative embodiment of the card 60 may take the form of a decoder card 70 as shown in FIGS. 6A and 6B to be inserted in and optically read by a card reader and detector 38. Generally, the detector 38 includes two optical sensors for sensing a bar code contained within the card 70 to enter data into the memory 30 (RAM) via inputs $T_0$ and $T_1$ ports on the microcomputer 34.

By the use of either card 60 or 70, a subscription type service may be provided to the public whereby only paidup subscribers may receive and de-encrypt the data transmitted by the broadcast station 16. Although, any of a variety of FM tuners could receive the message, it would be necessary to de-encrypt the serially transmitted message into an intelligible order before it could be used to display the desired information. Thus, it is contemplated that the de-encryption process as provided by the card 60 or 70 could be periodically changed in accordance with the pay period for the subscription. For example, if the user subscribed to his service by making monthly payments, a new card 60 or 70 could be issued to the user to permit, if his account is current, to receive and de-encrypt the transmitted message. If a subscriber had not made his current payment, he would not receive the current card 60 or 70, and therefore could not de-encrypt the presently transmitted message.

Figure 3:
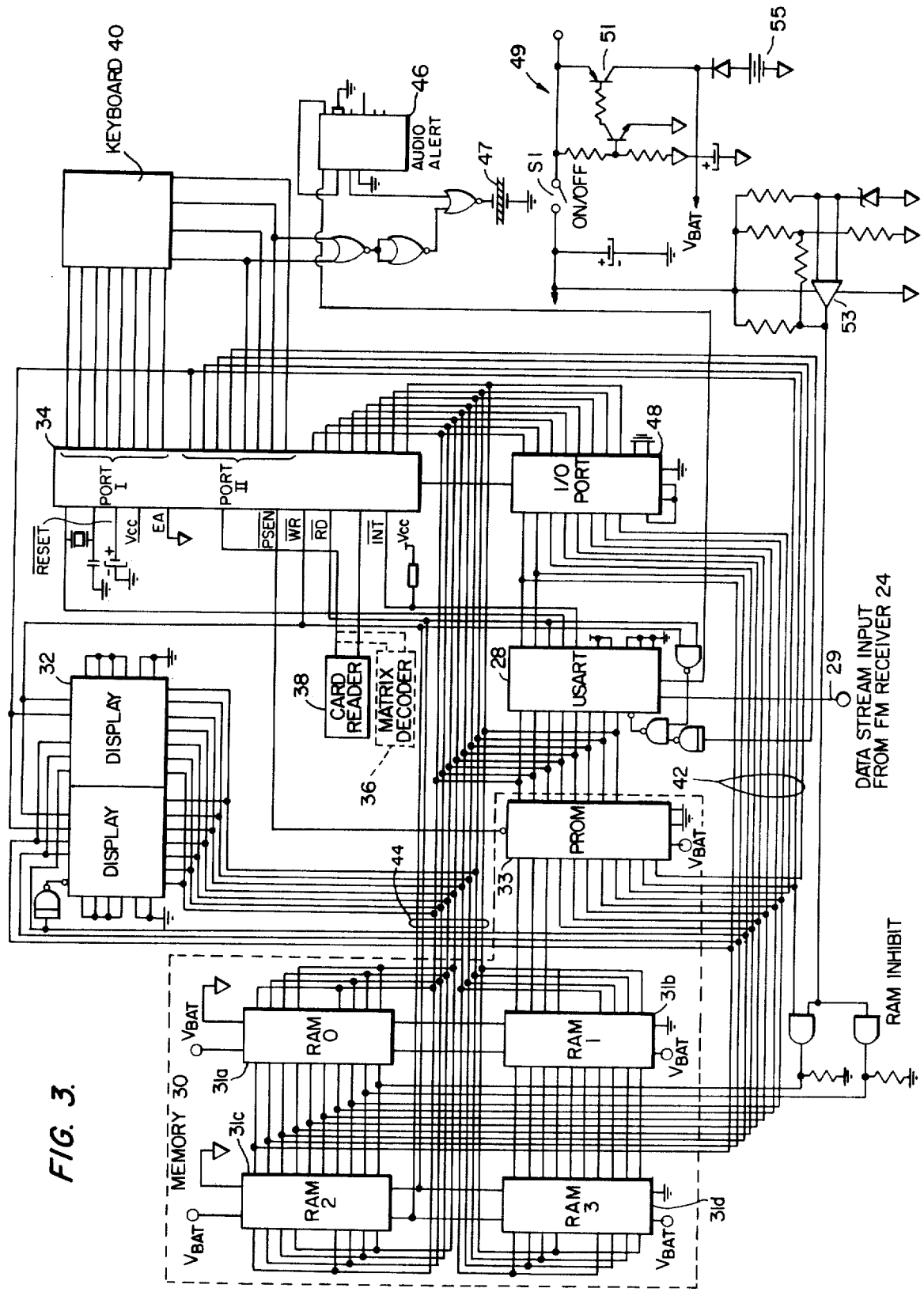
FIG. 3 is a detailed, schematic drawing of the elements of the receiver/display device as more generally shown in FIG. 2.

A specific, illustrative embodiment of the computer architecture including the microcomputer 34, the display 32, the memory 30 and serial/parallel interface 28 is shown in the schematic diagram of FIG. 3, wherein like numerals indicate like elements. It is understood that the output of the demodulator 26 is applied by the serial input line 29 to the $R_xD$ input of the interface 28 as manufactured by Signetics under their designation USART 2661. The microcomputer 34 takes the form of a microcomputer as manufactured by Intel under their designation 8048 and contains a single processor unit, an internal read only memory (ROM), an internal random access memory (RAM), timing clock circuits and interface ports I and II.

As shown in FIG. 3, the outputs of port I of the microcomputer 34 is connected to the row conductors of the keyboard matrix 40, whereas the column conductors of the matrix 40, are connected to selected inputs of port II. The internal computer memory is augmented by additional memory 30 including a plurality of RAMs 31a, 31b, 31c and 31d each taking the form of a RAM manufactured by Intel under their designation 5101, and an erasable, programmable, read only memory (EPROM) 33 manufactured by Intel under their designation 2716. The data output lines from the microcomputer 34 are applied to an input-output (I/O) latch 48 taking the form of a latch manufactured by Intel under their designation 8212 with the least significant nibble of its port 2 forming a 12 bit address to be applied via bus 42 to the external EPROM 33 and the external RAMS 31a, 31b, 31c and 31d. The address bus 42 is also used to select which of the light emitting diodes of the alpha numeric display 32 to be energized, and to actuate the interface 28. The alpha numeric display 32 may also take the form of that display marketed by Litronix under their designation DL2416. The following is an address map to indicate which of the internal memory of the microcomputer 34, the updatable memory of the RAMs 31a, 31b, 31c and 31d, the display 32 or the interface 38 is addressed:

| $\overline{WR}$ | $\overline{RD}$ | $\overline{PSEN}$ | $P_{23}$ $A_{11}$ | $P_{22}$ $A_{10}$ | $P_{21}$ $A_9$ | $P_{20}$ $A_8$ | $A_7$ | $A_6$ | $A_5$ | $A_4$ | $A_3$ | $A_2$ | $A_1$ | $A_0$ | Description |
|---|---|---|---|---|---|---|---|---|---|---|---|---|---|---|---|
| PROGRAM AND RAM ||||||||||||||||
| 1 | 1 | 1 | X | X | 0 | 0 | 0 | 0 | 0 | 0 | 0 | 0 | 0 | 0 | 1K Internal Program Memory |
|   |   |   |   |   |   |   |   |   |   | to |   |   |   |   |  |
| 1 | 1 | 1 | X | X | 1 | 1 | 0 | 0 | 0 | 0 | 0 | 0 | 0 | 0 |  |
| 1 | 1 | 0 | 0 | 1 | 0 | 0 | 0 | 0 | 0 | 0 | 0 | 0 | 0 | 0 | 2K External Program Memory |
|   |   |   |   |   |   |   |   |   |   | to |   |   |   |   |  |
| 1 | 1 | 0 | 1 | 0 | 1 | 1 | 1 | 1 | 1 | 1 | 1 | 1 | 1 | 1 |  |
| 0 | 1 | 1 | 1 | 0 | 1 | 1 | 0 | 0 | 0 | 0 | 0 | 0 | 0 | 0 | Write External RAM |
|   |   |   |   | and |   |   |   |   |   | to |   |   |   |   |  |
| 0 | 1 | 1 | 1 | 1 | 0 | 0 | 1 | 1 | 1 | 1 | 1 | 1 | 1 | 1 |  |
| 1 | 0 | 1 | 1 | 0 | 1 | 1 | 0 | 0 | 0 | 0 | 0 | 0 | 0 | 0 | Read External RAM |
|   |   |   |   | and |   |   |   |   |   | to |   |   |   |   |  |
| 0 | 1 | 1 | 1 | 1 | 0 | 0 | 1 | 1 | 1 | 1 | 1 | 1 | 1 | 1 |  |
| 1 | 0 | 1 | 1 | 1 | 0 | 0 | 1 | 1 | 1 | 1 | 1 | 1 | 1 | 1 |  |
| PERIPHERAL DEVICES ||||||||||||||||
| 0 | 1 | 1 | 1 | 1 | 1 | 0 | 0 | 0 | 0 | 0 | 0 | 0 | 0 | 0 | Write Display |
|   |   |   |   |   |   |   |   |   |   | to |   |   |   |   |  |
| 0 | 1 | 1 | 1 | 1 | 1 | 0 | 0 | 0 | 0 | 0 | 0 | 1 | 1 | 1 |  |
| 1 | 0 | 1 | 0 | 1 | 1 | 1 | X | X | X | X | X | X | 0 | 0 | Read UART data |
| 1 | 0 | 1 | 0 | 1 | 1 | 1 | X | X | X | X | X | X | 0 | 1 | Read Uart Status |
| 0 | 1 | 1 | 0 | 1 | 1 | 1 | X | X | X | X | X | X | 1 | 0 | Write UART mode |
| 0 | 1 | 1 | 0 | 1 | 1 | 1 | X | X | X | X | X | X | 1 | 1 | Write UART command |

Using an address as provided by the above map, data can be transmitted via the data bus 44 from the microcomputer 34 to any of the RAMs 31a, 31b, 31c and 31d, the display 32 or the interface 28, if the write line ($\overline{WR}$) is brought to 0. Further, also using the above indicated addresses, data can be transferred via the data bus 44 from selected of the RAMs 31a, 31b, 31c and 31d, the interface 28 to be read by the microcomputer 34, if the read line ($\overline{RD}$) is brought to 0. For example, data maybe read from one of the RAMs 31 or the interface 28 through the matrix decoder 36. Program instructions are placed on the data bus 44 if the program store enable ($\overline{PSEN}$) input of the microcomputer 34 is brought to 0.

The keyboard 40 is scanned by selecting port I as output port and writing a series of one's on port I, except owe of the 8 bit lines which writes a 0. This 0 is scanned across the 8 input lines of port I. As indicated above, the outputs of port I are connected to the column conductors of the matrix 40, whereby a 0 is scanned across each of the eight row connectors. The most significant nibble of the port II is read as input column, one bit at a time. If one of the points of interception representing a key of the matrix 40 is closed, the appropriate column and row conductors can be decoded through this circuitry. As will be explained, the keys of the matrix 40 can be sequenced to define data requests.

The serially inputted data describing ticker symbols, option code, expiration month and stock price (for options), expiration month and year (for futures), high, low and last prices of stocks, options, and futures, and recommendation codes are stored in selected portions of the RAMs 31a, 31b, 31c and 31d in accordance with the following data field:

puter 34 activates the switch array 45 by selecting bits 4 and 6 of port 2, and upon activation "reads" which of terminals 43 are connected to ground and which are connected to B+. The classifier 41 sets a terminal into one of sixteen classes; each terminal class enabling the display of specific messages which are only decodable by that terminal class.

As will be explained in detail, each data block 13 includes a promotional message that occurs first and is used by the interrupt routine to initiate the examination

| RECORD NUMBER LOC. IN RECORD | HEX ADDR | TICKER SYMBOL AND OPTION CODE 5 bytes 0 1 2 3 4 | FIELD SPECIFICATIONS MONTH/ STRIKE PRICE or YEAR 2 bytes 5 6 | LAST PRICE 4 bytes 7 8 9 A | NEWS ALERT/ RECOMMENDATION CODES 4 bytes B C D E | OFFSETS HIGH 3 bytes F 10 11 | LOW 3 bytes 12 13 14 |
|---|---|---|---|---|---|---|---|
| 1 | 000 | | | | | | |
| 2 | 015 | | | | | | |
| 3 | . | | | | | | |
| 4 | . | | | | | | |
| 5 | . | | | | | | |
| . | | | | | | | |
| 20 | 18F$_{16}$ | | | | | | |
| 21 | 1A4 | | | | | | |

As will be explained, as data derived from each repitition of the message block 13 is applied to the interface 28, the microprocessor 34 implements a comparison process, as will be explained in detail, to determine whether the information so transmitted to the receiver/display device 20 is of interest to its subscriber, i.e., whether a RAM location as shown in the above table has been dedicated to receive a particular piece of security data and if so, the new data is transferred to that location within one of the RAMs 31.

The computer elements shown in FIG. 3 are powered by a power supply connected to a conventional AC source, which provides a B+ voltage, illustratively 5 volt, to a power sensing circuit 49 including a switch S1 that serves to apply and disconnect power to the circuit. A transitor 51 serves as a voltage sensing element to detect power failure and is connected to a back-up battery 55. Upon battery failure, the transistor 51 is rendered nonconductive whereby the back-up battery 55 forward biases its diode to provide a voltage V-BAT to each of the RAMs 31. When the normal B+ voltage is applied to the emitter of transitor 51, it is rendered conductive to provide through the closed switch S1 a voltage VCC to a comparison circuit comprised essentially of an operational amplifier 53 that acts as a voltage comparator with the reference voltage established on the zener diode. When the input supply voltage falls below 4.7 volts, the comparison circuit provides an inhibit signal to a pair of AND gates whereby inhibit signals are provided to the CE inputs of the RAMs 31a, b, c and d. In addition, there is included a buzzer 47 taking the form of a piezo element that is energized by a high-frequency, e.g. 1K Hz, signal as derived from a divider 46. The buzzer 47 is energized to provide an indication that a promotional message is being received or to alert the user of the receiver/display device 20 that a standby period, in which data is being accessed, has now ended and that the requested data is available.

A classifier 41 comprising an array 45 of CMOS switches and terminals 43, is connected between the least significant 4 bits of port 1 of microcomputer 34 and terminals 43 labeled A, B, C, and D. The microcomof remaining messages of the data stream. Within each promotional message is a character W that identifies the class of its message. During initialization, the microcomputer 34 examines the particular class of message that the device 20 has been programmed by its classifier 41 to receive. In other words, during the manufacture of the device 20, the switch arrary 45 is set, i.e. is coded, with a binary code identifying which of the illustrative 16 message classes that the device 20 is to be classified to receive. In this manner, the broadcast station 16 may transmit a variety of messages and only those devices 20 that have been preclassified or set to receive the class of message will be permitted to receive and decode the message. In particular, the character W of the transmitted promotional message is matched with the class in the form of a binary number as set into the switch array 45 and if there is a match, the device 20 is enabled to receive that particular promotional message. Illustratively, the promotional message may be in the form of advice as to a particular security. In this context, it is comtemplated that a security advisor would have a particular set of clients and that he could limit the reception of his advice to only those clients by preclassifying or presetting their devices to receive his security advice.

Figure 4B:
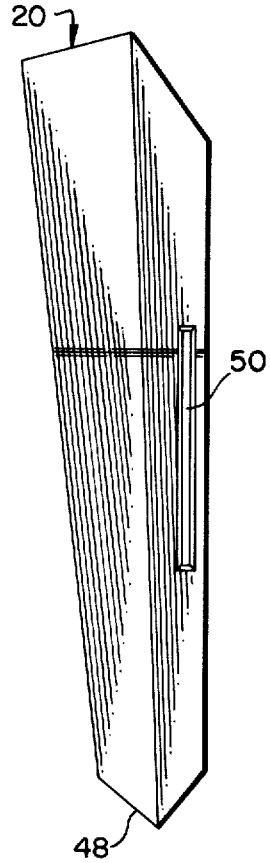

As described above, the serially transmitted data is encrypted by the encoding/encrypting apparatus 12b as shown in FIG. 1A. More specifically, the encryption process is effected by transmitting a special 8 bit character, upon the continously repeated output 17. Upon receipt by the receiver/display device 20, this character is compared with the bits of the 8 bit character stored within the RAMs 31 from the de-encryption card 60 or 70. To this end, the subscriber or user of the receiver/display 20 has a card, which may take the form of either of the matrix decoder type card 60 or the bar decoder type card 70. Each of these cards resembles a credit card and is disposable within the slot 50 of the housing 48 of the receiver/display 20, as shown in FIG. 4B.

The matrix decoder type card 60 is more fully shown in FIGS. 5A and 5B as taking the form of an electronic patch cord fabricated as a printed circuit on a flexible or rigid circuit board 59. The card 60 includes a first side 61 as shown in FIG. 5A having a first set of contacts 62-1 to 62-10 arrayed on an extended narrowed portion 67 adapted to be disposed within the slot 50 of the devices housing 48. As shown in FIG. 5B, a second set of contacts 63-1 to 63-10 are disposed upon a second side 65 of the card 60. Upon insertion of the card 60 within the slot 50, the two sets of contacts 62 and 63 are electrically coupled to the matrix decoder 36 as shown in FIG. 3 to effectively reorder, i.e., de-encrypt, the 8 bit parallel word and transmit it to the $T_0$ and $T_1$ inputs of the microprocessor 34. As shown in FIG. 5A, each of the first set of contacts 62 is electrically coupled to its respective electrical conductor 64-2 to 64-9. As shown in FIG. 5B, each of the second set of contacts 63 is connected to its respective conductor 66-2 to 66-9 as disposed upon the second side 65 of the card 60. Electrical interconnections 68-1 to 68-8 are provided between the conductors 64 and 66 as shown in FIGS. 5A and 5B. The electrical connections 68 are formed by through-hole plating in the specific 8 locations or by through-hole plating 64 locations and "blowing" 56 of the 64 locations with preprogrammed electrical current, thereby leaving the 8 connections 68 as shown in FIGS. 5A and 5B. In either case, specific one-to-one transforms of the 8 incoming bits as applied to the first set of contacts 62 is provided by the selective placement of the electrical interconnections 68 between the conductors 64 and 66. The specific interconnections 68, as shown in FIGS. 5A and 5B, provides decoding in accordance with the following matrix $A(d_{in}=Ad_{out})$:

$$A = \begin{vmatrix} 00001000 \\ 00000100 \\ 00100000 \\ 00000001 \\ 10000000 \\ 00010000 \\ 01000000 \\ 00000010 \end{vmatrix}$$

Thus, the decoder card 60 provides an electrical analog means functioning as an orthogonal 8×8 matrix, which one-to-one maps a 8 dimensional unit vector into another 8-dimensional unit vector, i.e., reordering or de-encryting the 8 bit character into a form intelligible by the receiver/display 20.

The bar decoder type card 70 is shown in FIGS. 6A and 6B and is imprinted with a bar code taking the form of an array of bars 72 as shown in FIG. 6A. The card 70 is also adapted to be inserted into the slot 50 of the device's housing 48. As seen in FIG. 6A, the bars 72 are disposed parallel to each other with selected spaces 75 there between arranged to form characters, which are read by the card reader and detector 38 as shown in FIGS. 2 and 3. The card reader 38 is adapted to receive the card 70 upon insertion into the slot 50 and includes GaAs light emitting diodes (LEDs) with peak emission near 850 nm disposed on one side of card 70 and a light sensitive means in the form of a silicon planar photodiode as manufactured by TRW under the designation TRW 730 with peak sensitivity in the same optical range disposed upon the same side of the card 70. Thus upon insertion of the card 70 in the slot 50, its bars 72 are moved past the LEDs, thus permitting the infrared radiation as directed by the diode to be modulated by the bars 72 and subsequently sensed by the planar diode. The output of the diodes are applied to a signal conditioning circuit in the form of comparators such as LM-339's manufactured by National Semiconductor. The output of the comparators are designed to provide TTL level signals that are applied to the input pins T1 and T0 of the microcomputer 34 as shown in FIG. 3. The microcomputer 34 in accordance with the program as stored within its ROM decodes the logic levels 0's and 1's in accordance with the number and spacing between the bars 72 to provide in an electrical sense a byte of 0s and 1s to be stored in turn within the internal RAM of the microcomputer 34 to de-encrypt the received data characters as applied to the interface 28. More specifically, the byte is transferred as stored within the internal RAM of the microcomputer 34 to the external RAM 31a, b, c, d, and thereupon compared with the special 8-bit character received from the continously repeated output 17.

As shown in FIGS. 6A and 6B, the card 70 is constructed to ensure security of the data encoded by the spacing of the bars 72. In particular, the bars 72 are formed or printed with an ink that absorbs the infrared radiation as emitted by the LEDs and in one illustrative embodiment may be printed with a "Naphthol Green" dye. As shown in FIG. 6B, the variable spaces 75 formed between the bars 72 are printed with "Brilliant Green" dye. Both dyes appear bluegreen to the eye, yet the "Naphthol Green" dye has a much stronger infrared absorption than the "Brilliant Green" dye providing the necessary contrast to be detected and differentiated by the noted planar diodes. However, to the naked eye and to a photocopy machine, the spaces 75 and bars 72 appear to be the same and the card 70 as a whole appears to be without visible bars and spaces. As shown in FIG. 6B, the bars 72 and spaces 75 are mounted upon a substrate 79 and a protective layer 77 is disposed over the layer 73 in which the spaces 75 and bars 72 are formed.

An alternative embodiment (not separately illustrated) of the bar decoder 70, designed to ensure security of the data encoded by the spacing of the bars 72, is illustratively constructed with a substrate 79, bars 72 printed with an infrared absorbing ink, and a protective layer 77 disposed over layer 73. In this embodiment, the spaces 75 would not need to be printed. In this embodiment, the protective layer 77 is composed of a material which strongly absorbs visible light yet allows near infrared light to pass relatively unattenuated. A specific physical embodiment may use a material manufactured by Union Carbide, UDEL-P-1700 with black dye 1615, for the protective layer 77. A thickness of 40 mils of this material appears black/deep blue to the naked eye and no infrared absorbing bars 72 may be seen through the layer 77. However, the infrared transmissive property of the protective layer 77 allows for the necessary contrast between the bars of infrared absorbing ink 72 and the infrared reflecting substrate 77, so that this contrast may be sensed by the noted planar diodes.

To ensure that the decoder card 70 is not read and then removed for further use by an unauthorized individual, the card reader 38 as shown in FIGS. 2 and 3, includes a card sensing switch, which upon insertion of the card 70 into the slot 50 is closed to provide a high or logic level 1 signal to the RAM 31 indicating that the card 70 is so inserted; by contrast a logic level 0 input to the RAM 31 indicates that no card is present. This card sense logic removes power to the external RAM 31 and thus destroys the contents of the external RAM 31 which contains the byte of data as obtained from the card 70.

The receiver/display device 20 is capable of providing its user with quotations on a variety of securities including stocks, futures and options. Also it is contemplated that recommendations on any of these securities may also be received and displayed and the message does and therefore the source of recommendation would be dependent upon the presetting of the terminal classifier 41. To this end, the user selects by actuating one of the keys of the keyboard 40 as shown in FIG. 4A, the keyboard 40 being coupled to the ports I and II of the microcomputer 34 as shown in FIGS. 2 and 3. Generally, the keyboard 40 includes 26 alpha keys one for each letters of the alphabet from A to Z and so shown in FIG. 4A. There are additional function keys 51 to 56, which have dedicated functions as will now be described. By actuating the quote or "QTE" 51, the user recalls from memory and in particular from the RAMs 31, a quotation on any of the securities selected to be updated from the stream of information transmitted to the device 20 and to be stored within the RAMs 31. In similar fashion, the user can press the recommend or "REC" key 55 whereby a recommendation concerning any of the selected securities may also be provided upon the display 32. Each of the future of "FUT" key 53 and the option of "OPT" key 54 may be actuated by the user to teach the device 20 and particularly the RAMs 31 to receive information relating respectively to a selected future or option. The enter or "ENT" key 52 is also actuated in such a teaching process. The clear key 56 is actuated, as the name implies, to clear information that is no longer desired. As is evident from FIG. 4A, keys A to V have a dual function depending upon the order in which these keys are depressed. In one set of operations, the keys A to T designate locations within the RAMs 31 in which security information is stored to retrieve and display same upon the display 32. In another sequence of operations, keys A through J are actuated to enter numeric information such as the striking price of an option, whereas keys K through V may be actuated to designate a month of expiration of an option or future. Further, as will be explained, the Z key may be used to inquire if the device 20 has been taught to receive data pertaining to a particular security and to identify the location, i.e., A through T, in which the security information is stored within the RAMs 31, and then display information from the particular location.

The particular sequence of actuating the keys of the keyboard 40 to obtain data with regard to a security or to teach the device 20 to receive updated information concerning a particular security, will now be explained. To teach or code the receiver/display device 20 to follow a stock, the user actuates the following sequence of keys of the keyboard 40:

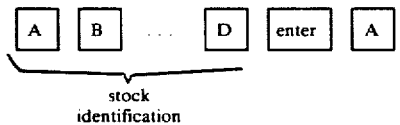

stock identification

Each square represents pushing the keys on the keyboard 40 as shown in FIG. 4A; A,B, ... D represent a generalized ticker symbol for a security (up to 4 characters); and A represents A-T of upper case letters on the keyboard 40. The device 20 stores in location "A" the ticker symbol "AB ... D". The user can store up to 20 stocks in this manner and recall quotes on any with two simple keystrokes as described below. The alphanumeric display 32 confirms the client's sequence of keys by displaying:

A B C $\bigwedge$D

As an example, if the client wanted to teach the receiver/display device 20 to follow IBM and store this stock in location A on the keyboard 40, he would actuate in sequence the following keys:

| I | B | M | enter | A |

The alphanumeric display 32 confirms this by displaying:

IBM $\bigwedge$A

Prices on client selected securities, entered into RAMs 31 using the procedure described above, are recalled by selecting two keys, the QTE key 51 and the letter key which corresponds to the memory location reserved for the security. In the present example, IBM is located at "A", so a quote on IBM is obtained by actuating the keys:

| quote | A |

If the client does not remember which location in RAMs 31 contain which security, he actuates the following sequence of keys, where the Z key is used as will be expalined to initiate the search:

| I | B | M | quote | Z |

If the user had previously designated IBM as a security located somewhere in locations A through T of the RAMs 31, the price quote appears virtually instantaneously on the display 32. If not, the IBM quote is still displayed, however a delay occurs (corresponding to the access time of the information from the data stream). The device 20 displays "STANDBY" on the display 32 during the access time, and when the quote appears the device 20 actuates the buzzer 47 to make the client aware of the upcoming prices, if they are available.

A user may obtain recommendations on stocks by replacing the "quote" keystroke with the "recommendation" or REC key 55. The classifier 41 will allow preselection of the message class and thus, the source of the recommendation displayed. Some devices 20 may be classified to allow no access to recommendations, some only to those only from a specific source or vendor. Operation of the keyboard 40 is otherwise similar to that used to obtain quotes. A recommendation on IBM is obtained by actuating the following keys:

assuming that IBM data is stored in location A. If IBM is in memory location (A-T) in RAMs 31, the recommendation appears on the display 28. If IBM were not among the closely followed securities, the device 20 displays "STANDBY" until the information is obtained from the incoming data stream. If the recommendation data is not present on the data stream, the device 20 displays "NO DATA".

To teach the device 20 to follow options, its user actuates the following sequence of keys:

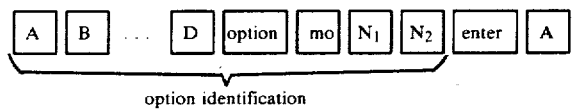
option identification where A,B, . . . D represent a generalized option symbol corresponding to a given otpion type, e.g., an AMEXO "call" on National Semiconductor might be "NSMA", the same "call" on the CBO might be represented "NSMC". If "puts" are authorized, they could be represented as NSMB on AMEXO and NSMD on the CBO. The key [mo] represents the month of expiration of the option and N₁, N₂ represent the striking price of the option. The eight character display is insufficient to display a complete option. However it confirms the keystrokes by displaying the alpha keys pressed and the location of the stock data in RAMs 31. For example, the Fisher Porter option: option: FPA—ΛA or the National Semiconductor option: option: NSMA—ΛA.

Prices on options entered into RAMs 31 using the same procedure outlined above, are recalled by selecting the QTE key 51 and the letter which corresponds to the location in RAMs 31 that was reserved for the security. Similarly, if the client does not remember that Fisher Porter's March 80s call prices are at location A, he simply presses:

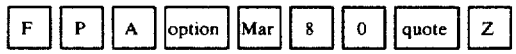

to obtain the identical information. If the option is not in the RAMs 31, the display 32 displays "STANDBY" until the quote is obtained. Recommendations are obtained by actuating the "REC" key 55 instead of the "QTE" key 51. This procedure is similar to that used to obtain recommendations on stocks. To teach the device 20 to follow futures, the user actuates the following sequence of keys:

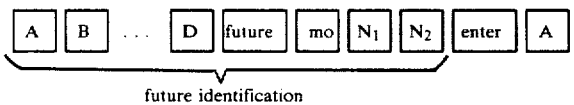
future identification where A,B, . . . D represent the general ticker symbol for the future (up to four characters), [mo] represents the month of expiration of the future and N1, N2 represent the last two digits of the year of the future.

Prices on futures, entered into the RAMs 31 using the procedure outlined previously, are recalled by pressing the "QTE" key 51 and the memory location assigned to that future. This is identical to the procedure for stocks and options. Actuating the "REC" key 55 instead of the "QTE" key 51 displays a recommendation on the future. Prices on Futures are obtained using the keystroke sequence:

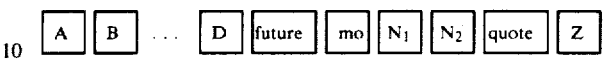

and recommendations using the keystroke sequence:

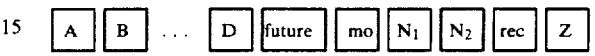

If the future is not in a previously defined location of the RAMs 31, the display 32 displays "STANDBY" while the information is retrieved from the data stream.

As illustrated in FIG. 4A, the display 32 is capable of providing 8 alphanumeric characters by selective energization of each digit to present a desired message. For example, after the "QTE" key 51 and A key have been struck in sequence, the display 32 provides a display of the security data as stored within "A" location the RAMs 31. If the data is not in the RAMs 31, i.e. the security is not located within any of the memory locations A-T, the word "STANDBY" is displayed upon the display 32 while the information is being retrieved from the data stream. If the information stored within location A is a stock as identified, and its high, low and last prices are given in a sequence of frames, noting that a frame is limited to display of 8 digits at a time. In an illustrative example, the high, low and last prices of IBM may displayed in the following sequence: Frame 1 "IBM high", Frame 2 "64⅝", Frame 3 "IBM low", Frame 4 "62½", Frame 5 "IBM last", and Frame 6 "63 ⅛". Similar framing of the data to be displayed upon the display 32 is provided to display option quotations, future prices, news alerts and recommendations on the 8 digit display 32.

The programs as primarily stored in the EPROM 33 for: (1) effecting display of selected security data; (2) the teaching or encoding of the device 20 to "Lookout" for selected data; and (3) comparing continuously the inputed data stream with respect to the preselected securities of interest and to update them as they occur within the stream, will now be explained. As will be described with respect to FIG. 7, an executive program is associated with the microcomputer 34 and is considered to be well known in the art for the particular, illustrative example of the microcomputer 34 as set out above. In general, the executive program initializes the input/output ports I and II, and further sets command and control words within the interface 28, thus preparing the interface 28 for the input data stream and initializes the device 20 according to the manner in which the classifier 41 has been preset. In addition, the executive program scans the column and row conductors of the keyboard 40 connected to the ports I and II to identify which key of the keyboard 40 has been pressed. The executive program also debounces the keystrokes permitting transients in the output signals to settle and thereafter, storing in sequence an indication of which keys as a particular user request. The microcomputer 34 calls a display routine to display data as from the RAMs 31 in response to the actuation of a particular sequence of keys. To this end, a display routine is stored in the EPROM 33 for accessing security data stored in the RAMs 31 for effecting its display upon the display 32; such a display routine is considered to be well known in the art for the particular microcomputer 34 and RAMs 31 as described above. More specifically, the display routine responds to decoded key stroke sequences for identifying the type of user request and then addresses particular data fields within the records of the RAMs 31; an illustrative example of the data field and the manner in which data is stored in the RAMs 31 has been described above.

In the data field as described, particular memory locations for the ticker symbols, option code, expiration month and stock price (for options), expiration month and year (for futures), high, low and last prices on stocks, options and future, and recommendation codes are designated. A significant aspect of this invention relates to the manner in which these locations in the RAMs are updated, potentially each time data is received in the input stream; as explained each RAM location is dedicated to data, e.g., a security of interest to the subscriber.

As the input stream of data is received as shown in FIG. 3, it is serially applied via line 29 to the interface 28 as explained above. Each group of submessages provides information as to a particular security and includes a data character identifying the particular security in terms of a set of alpha characters corresponding to the security's ticker symbol. The ticker symbol of each group of data words is compared to the ticker symbols of those securities that the device 20 has been taught or dedicated to receive and display. In a first embodiment of this invention, an interrupt routine is shown in a high level flow chart of FIG. 9 for monitoring the input stream of data as applied via the line 29 to the interface 28. The interrupt routine is entered at step 100 and in step 102, a character is transferred from the interface 28 to an accumulator, which comprises a scratch pad type of memory within the microcomputer 34. As will be explained below in greater detail, the executive program is executed continuously by the microcomputer 34 and is interrupted by the interrupt routine as each character byte is received and stored in the interface 28, whereby a data ready signal $R_xRDY$ is applied to the interrupt input $\overline{INT}$ of the microcomputer 34 and the interrupt routine is entered at step 100. Next, in step 104 the parity of the input character using a well-known parity check system, is checked and if the character is incorrectly formatted as determined by its parity bit, that character is deleted and the message flag, which indicates that a comparison has been made between data within the input stream and that stored within the RAMs 31 is reset. Next in step 108, a review of the character within the accummulator is made and if it is an alpha character, it is stored within a temporary register within a known location within the RAMs 31 along with the other alpha characters that have immediately proceeded it. A sequence of five or less alpha character forms the ticker symbol identifying a particular security. Step 108 determines whether the character within the accumulator is an alpha type, and if yes, the interrupt routine moves to step 110 which transfers the identified alpha character from the accumulator to a temporary RAM register before effecting a return. If sufficient alpha characters are stored in the temporary RAM location, a test flag set, and upon the next occurrence of the interrupt routine, step 112 will sense the test flag and will call the call flag routine 114, which compares the alpha characters in the temporary RAM location for correspondence with those ticker characters that have been taught or encoded within the device 20. If correspondence is detected, step 114 sets the message flag. As other characters arrive, step 112 will sense the presence of the message flag and will move the routine to step 116. Step 116 determines whether the message flag identifies a number and if so will move to step 118 to store the numbers in the appropriate fields of the RAMs 31. In similar fashion, if the message flag identifies a month, step 120 calls step 122 to effect a recording of the data indicating a particular month into the appropriate location of the RAMs 31. In similar fashion if step 124 identifies the message flag, step 126 will decode the special characters used for news, recommendations, and options flags and will store the corresponding data in the appropriate RAM locations. Thereafter if no message flag is set, step 130 will discard the character and will reset the message flag before returning. Significantly, if the message flag is not set in step 114, the characters are discarded unless they are alphas; if alphas, the process repeats.

Figure 7:
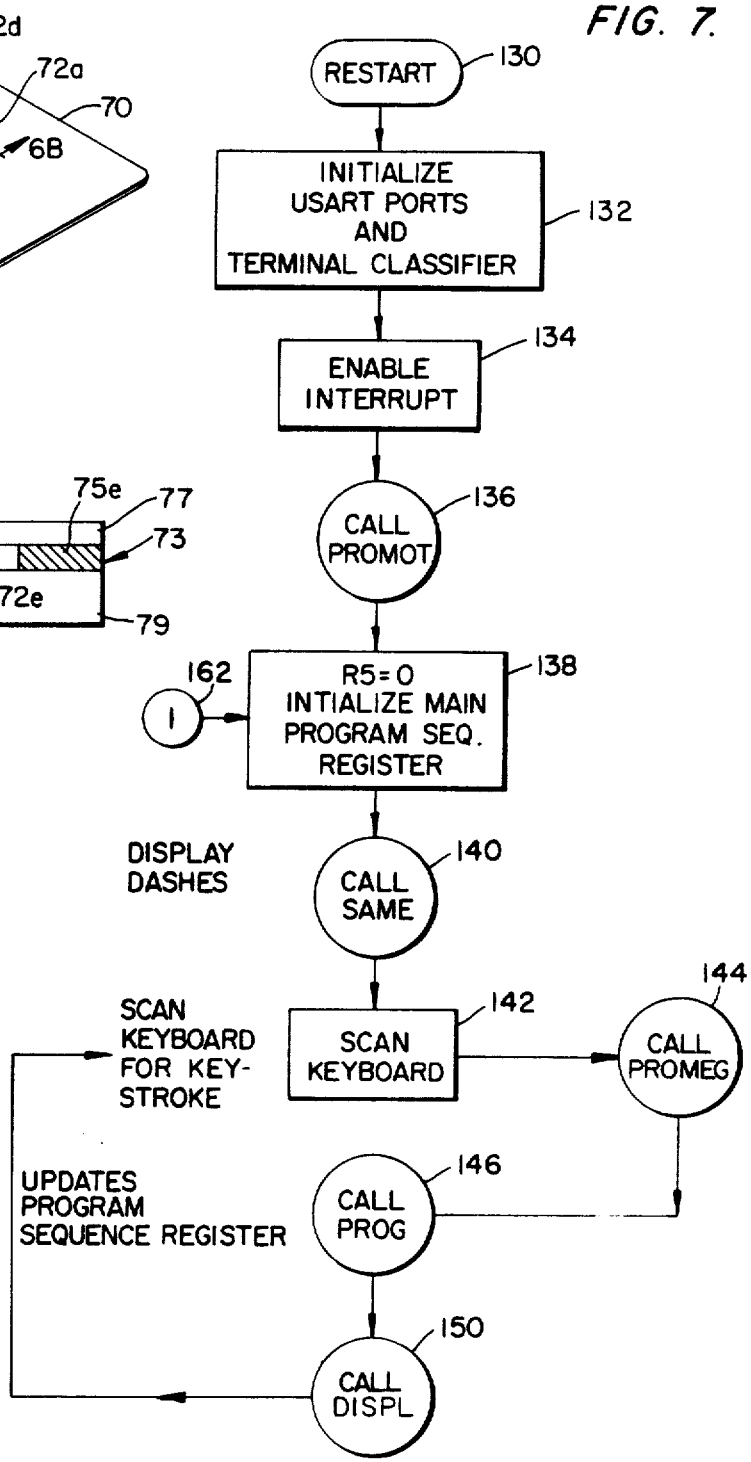
FIG. 7 is a high-level flow diagram of the executive program to be stored within the programmable read only memory (PROM) as shown in FIG. 3.

In the high level flow diagram of FIG. 7, the steps of the executive program for the microcomputer 34 is set out. When the microcomputer 34 is turned on, the execution of the executive program begins by entering the restart step 130. Thereafter, step 132 initializes the input/output ports I and II of the microcomputer 34, the interface 28 by placing suitable control words therein, and reads the classifier 41. Next, the interrupt input INT of the microcomputer 34 is enabled by step 134. As seen in FIG. 3, the interface 28 generates a RxRDY signal that is applied to the interrupt input INT of the microcomputer 34, whereby the microcomputer 34 transfers a data byte from the serial data stream as is applied from the FM front end and IF 24 and the demodulator 26 via line 29 to the interface 28, and from the interface 28 to a selected location in the internal RAM of the microcomputer 34; after the data transfer to the RAM location, a return is made to the executive program as shown in FIG. 7. When the microcomputer 34 acknowledges the interrupt, its suspends the execution of the executive program and automatically branches to the executive routine, as explained generally above, that will read the next data byte as placed in the interface 28 and depending upon its nature, store that byte in a selected RAM location or discard it. In particular, a first order determination is made as to whether the character byte is an alpha character and if not it is discarded. After the process is complete, a return is made to the execution of the executive program by the microcomputer 34. This interrupt is quite similar to a subroutine call except that the jump to the interrupt routine is initiated externally by the interface 28 rather than by a program. Thus, the programming is simplified to permit a character by character examination of the character bytes as they are loaded into the interface 28.

After initializing the interrupt, step 136 calls the PROMOT subroutine for actuating the display of the word "HELLO" and the audible beeper 47, and for displaying messages as stored in a selected location of the RAMs 31. THE PROMOT subroutine 136 will not be executed unless a flag has been set in bit 0 in a register R37 of the microcomputer 34. This flag is set during the execution of the interrupt routine to store the message as will be explained below. Next, step 138 initializes the main sequence register, i.e., register R5 within the microcomputer 34. The main sequence register R5 enables the executive program to understand the nature and sequence of key actuations upon the keyboard 40, and in particular, provides a location where the sequence of keys actuated may be temporarily stored and examined as will be explained below. Next step 140 calls the SAME subroutine to display a series of dashes indicating to the user of the device 20 that is waiting for instructions to be entered upon the keyboard 40. Next in step 142, the keyboard 40 is scanned by the outport I and four bits of the port II of the microcomputer 34. The PROMEG subroutine 144 effects the display of additional messages when the bit 0 of the register R37 equals 0 and when the classification of the message matches the classification of the device as prescribed by classifer 41. When a key is pressed, the executive program calls the subroutine PROG as shown in step 146, which interprets the key press and updates the main sequence register R5. The nature and sequence of the keystrokes is monitored by the PROG subroutine 146 and if the sequence of key actuations is not acceptable, step 146 loads the display 28 with the word "ERROR" which has been previously stored within the ROM 33. The PROG subroutine 146 examines the main sequence has register R5 and when a complete and proper key sequence has been so entered, the PROG subroutine 146 sets a flag whereby the function so requested by that particular sequence of keys is called. In addition, the PROG subroutine 146 loads a display buffer within the internal RAM of the microcomputer 34 with a representation of each key so pressed in the desired sequence. Finally, the executive program calls the DISP subroutine 150 to cause the contents of the display buffer to be made visible upon the display 32. The PROMOT routine 146, shown generally in FIG. 7 is considered to be well-known in the art and further explanation is not deemed necessary.

Figure 8B:
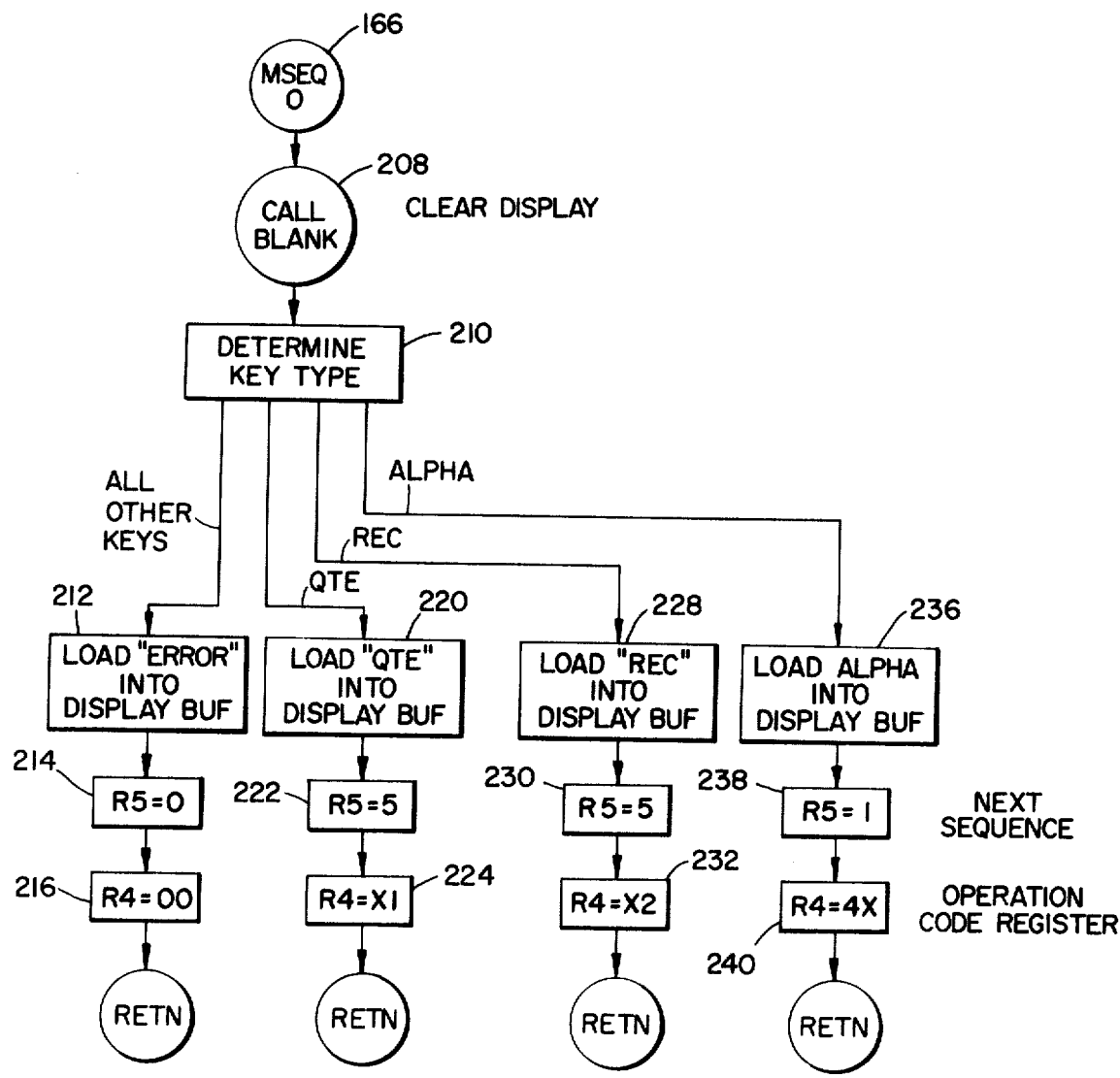

The PROG subroutine 146 is entered from the executive program discussed above with respect to FIG. 7. The PROG subroutine 146 will be now further explained with respect to FIGS. 8A to 8I, starting with FIG. 8A. The PROG subroutine 146 permits the keys of the keyboard 40 as shown in FIG. 4A to be used for multiple functions dependent upon the sequence of the actuation of the keys. As shown in FIG. 4A, the alpha keys A through J may indicate if pushed in a prescribed sequence either the alpha character or the numeric characters 0 to 9, whereas the alpha keys K through Z may indicate its alpha character or the months January through December. Generally, the PROG subroutine 146 interprets each actuation of a key of the keyboard 40 and combines such key actuation with the previous actuations to identify the correct interpretation to be given to the key actuations. More specifically, the PROG subroutine 146 assigns numbers to the keystroke events and these numbers are stored in the main program sequence register R5 of the microcomputer 34. In FIG. 8A upon entering the PROG subroutine 146, a determination is made in Step 160 of whether the clear key 56 has been pressed and if so a return is made through the step 162 to step 138 of the executive program as shown in FIG. 7. Thereafter a determination is made of the number stored previously within the program sequence register R5 by steps 164, 168, 172, 176, 180, 184, 188, 192, 196, 200 and 204, to determine program flow to any of the eleven separate subroutines MESQ 0 166, MSEQ 1-3 170–MSEQ C 206.

As is evident from a review of FIGS. 8B to 8H, the response of the PROG routine 146 to a particular actuation of the keys is to effect the transfer of data from RAMs 31 to the display buffer to eventually be displayed on the display 32. A particular example of the process of the subroutines MSEQ 0 to MSEQ C will now be explained with respect to FIGS. 8B and 8C. For example, if the user of the receiver/display device 20 desires to teach it to follow news and recommendations of American Telephone & Telegraph (NYSE Ticker Symbol: T) the user actuates the following sequence of keys:

| KEY PRESSED | SUBPROGRAM EXECUTED | NEXT SUBPROGRAM | DESCRIPTION |
|---|---|---|---|
| T | MSEQ0 | MSEQ1 | TICKER SYMBOL |
| ENTER | MSEQ1 | MSEQ2 | FUNCTION |
| A | MSEQ5 | MSEQ0 | MEMORY LOCATION |

Figure 8C:
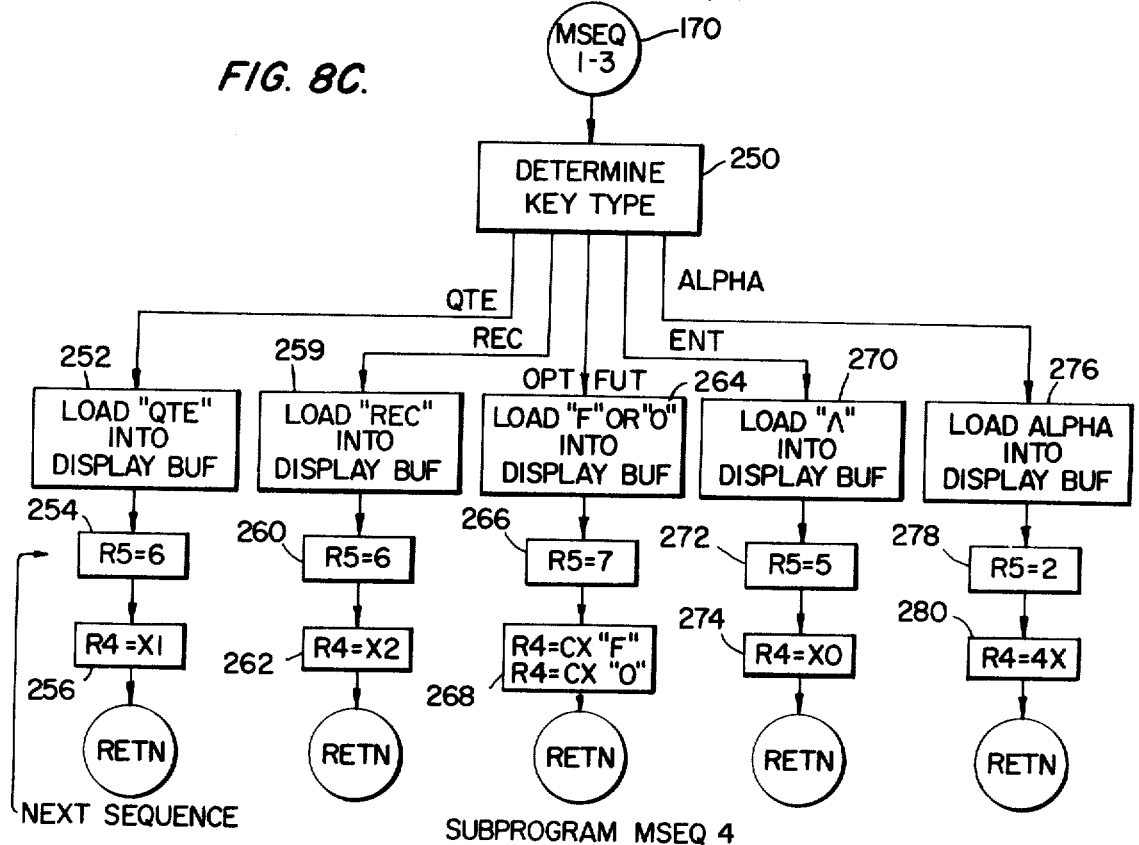
Figure 8D:
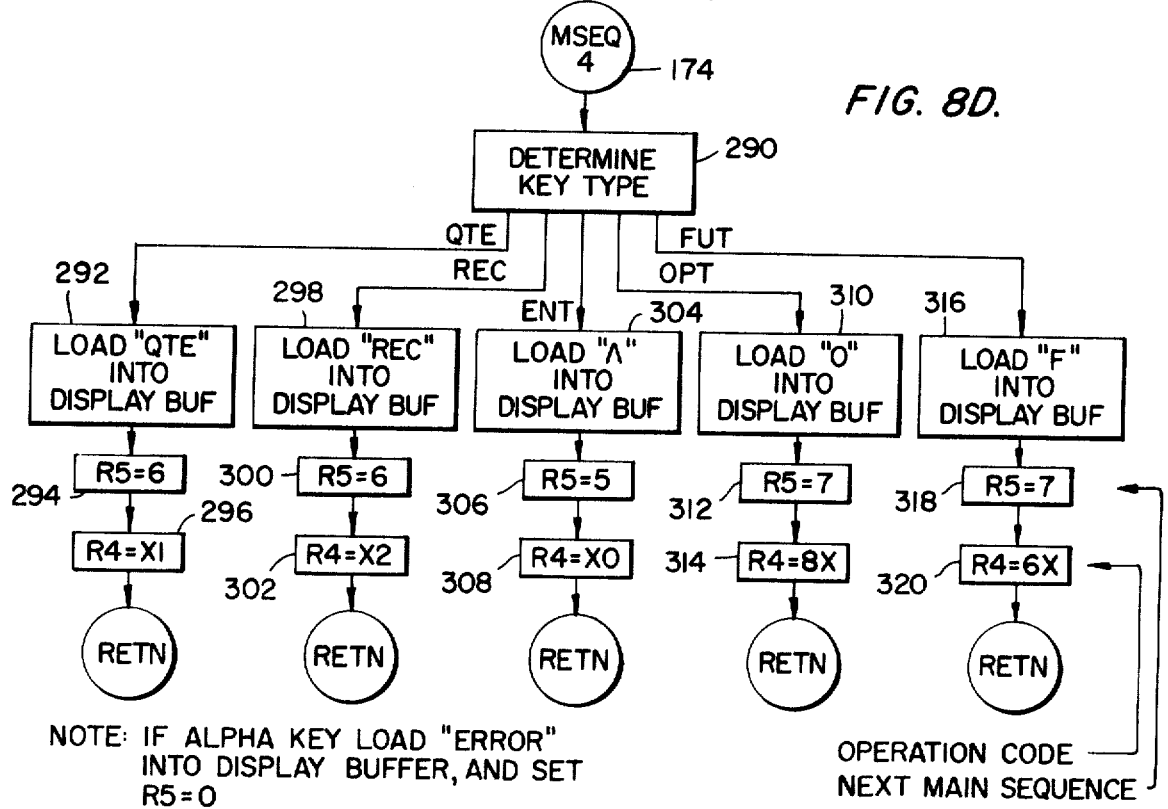
Figure 8E:
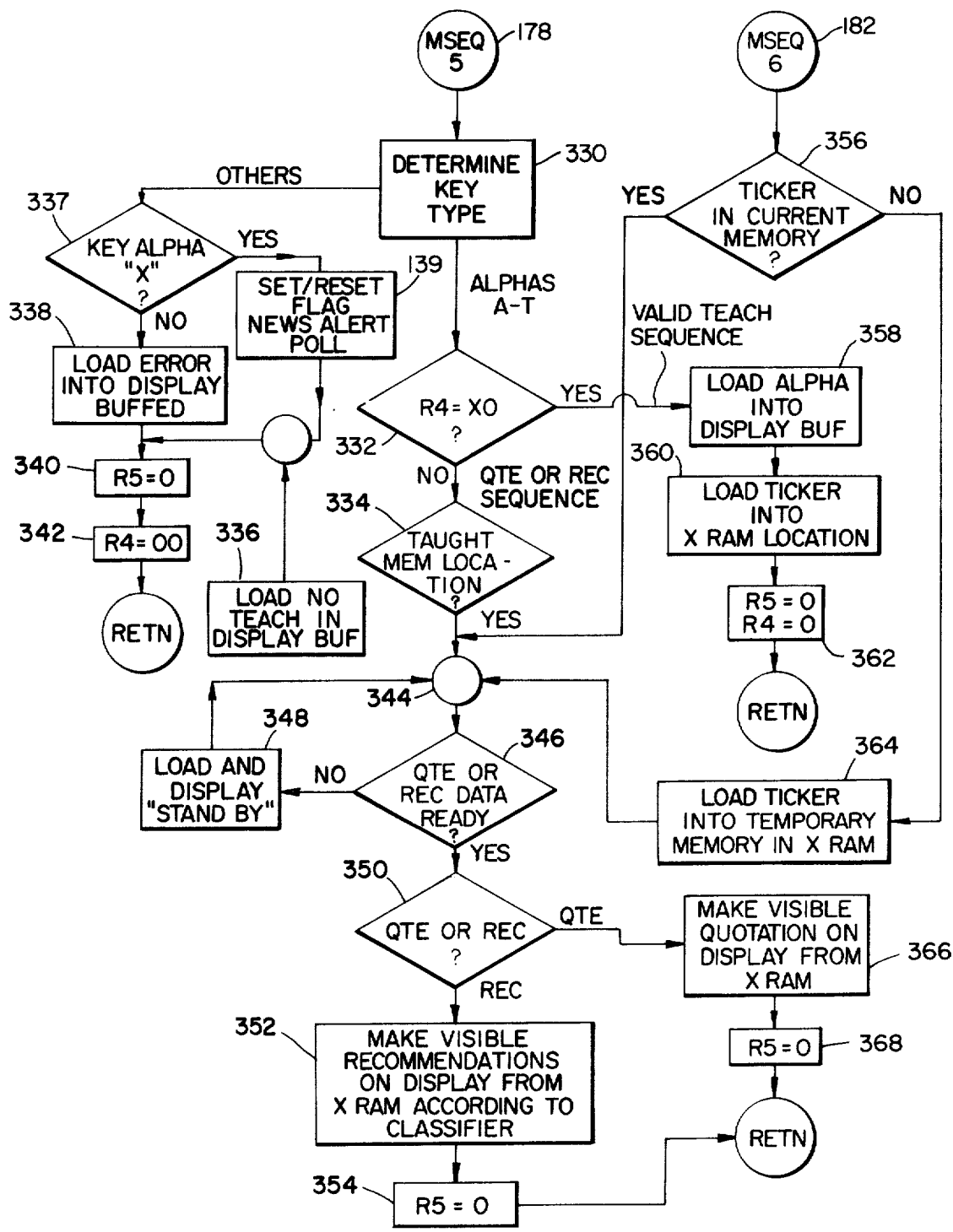
Figure 8G:
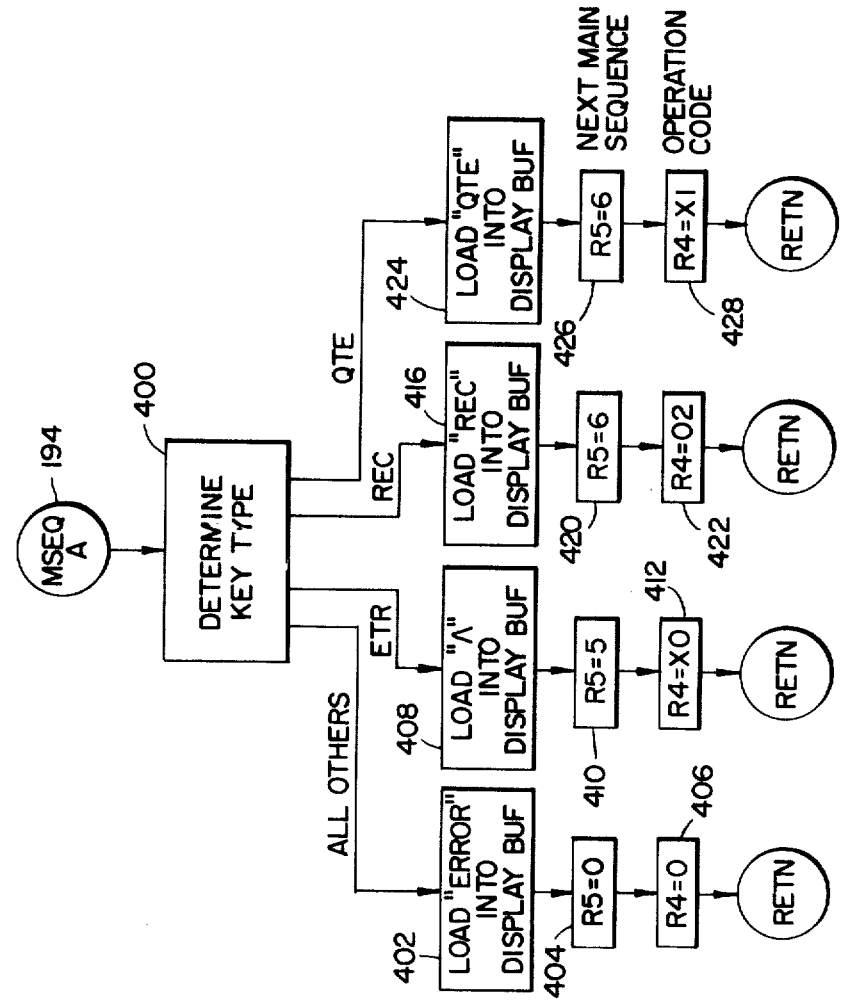

The actuation of the first key executes the routine MSEQ 0 (unless the clear key 56 was depressed). The second subroutine depends upon the specific key pressed during the first keystroke. For example, if the ALPHA key is the first key pressed, an interrogation of the main program sequence register R5 by step 164, as shown in FIG. 8A, indicates the number stored in the register R5 equals zero, whereby the PROG subroutine moves to the MSEQ 0 subroutine 166 as more fully shown in FIG. 8B. Step 208 calls for a series of blanks to be displayed upon the display 32. Thereafter, step 210 determines the type of key actuated and in the case where an ALPHA key was depressed, the subroutine continues with step 236, wherein the key is displayed upon the display 32. Next in step 238 a number 1 is stored in the program sequence register R5, and thereafter step 240 sets a value of 4X into an operation code register R4 also contained within the microcomputer 34 before effecting a return. The information disposed in the operation code register R4 indicates whether one is performing a recommendation or a teaching function. In the instance where the 4X is entered, the X indicates a "don't care" or blank state, and the 4 indicates a teaching function. The entry of the X2 and X1 indicates that the process desires to obtain a recommendation or a "teaching function". The R4 and R5 registers of the microcomputer 34 determine together the machine's state and will be examined to determine which of the subroutines in FIGS. 8 to be called. Upon the actuation of the next key, step 168 determines that a "1" is in the register R5 and thus proceeds to the subroutine 170 as shown in FIG. 8C. Step 250 determines, for the present example, that the second actuated key is an enter of "ENT" key 52 and thus proceeds to step 270 that presents a carrot " " to be displayed by display 32, before entering by step 272 a "5" in the register R5 and by step 274 an "XO" in the register R4, before returning. Upon the execution of the third key, step 176 determines that the register R5 contains a "5" and the subroutine proceeds to the subroutine 178, as shown in FIG. 8E, wherein step 330 determines that the "A" key has been actuated to proceed to step 332 to examine the contents of the register R4. If the contents of register R4 equals zero as previously set by step 274 of the present example, the subroutine moves to step 358, wherein the ALPHA indicative of the RAM location is loaded into the display buffer within the RAM's 31 to indicate that the A location is dedicated to the storing of the American Telephone & Telegraph security data. Step 360 loads the ticker symbol, e.g. "T", into the dedicated location A of the RAMs 31. Thereafter, registers R5 and R4 are reset to zero by step 362, thus preparing the PROG subroutine to receive and decode the next sequence of key actuations.

Figure 8F:
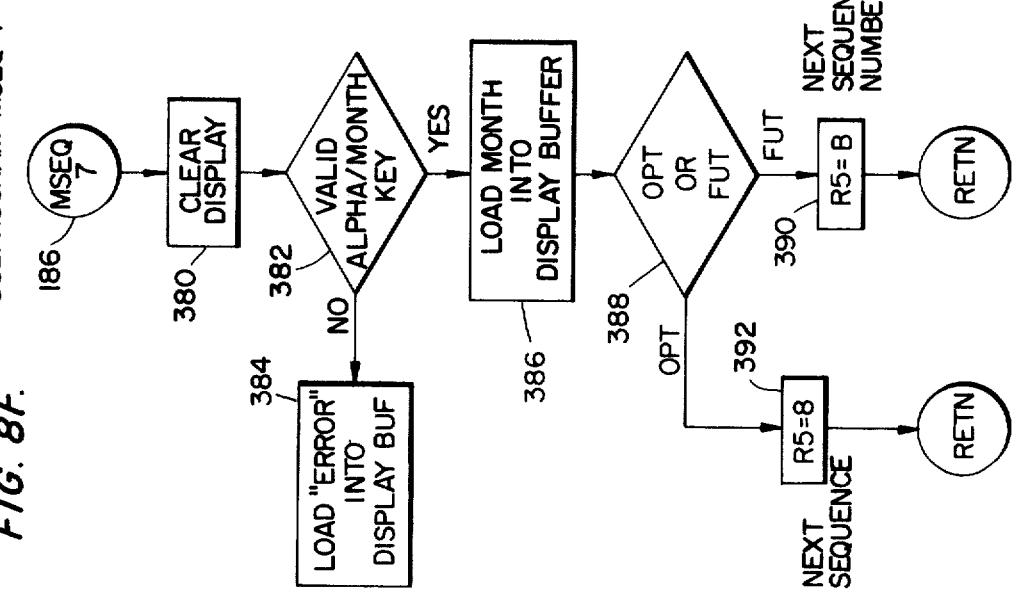
Figure 8H:
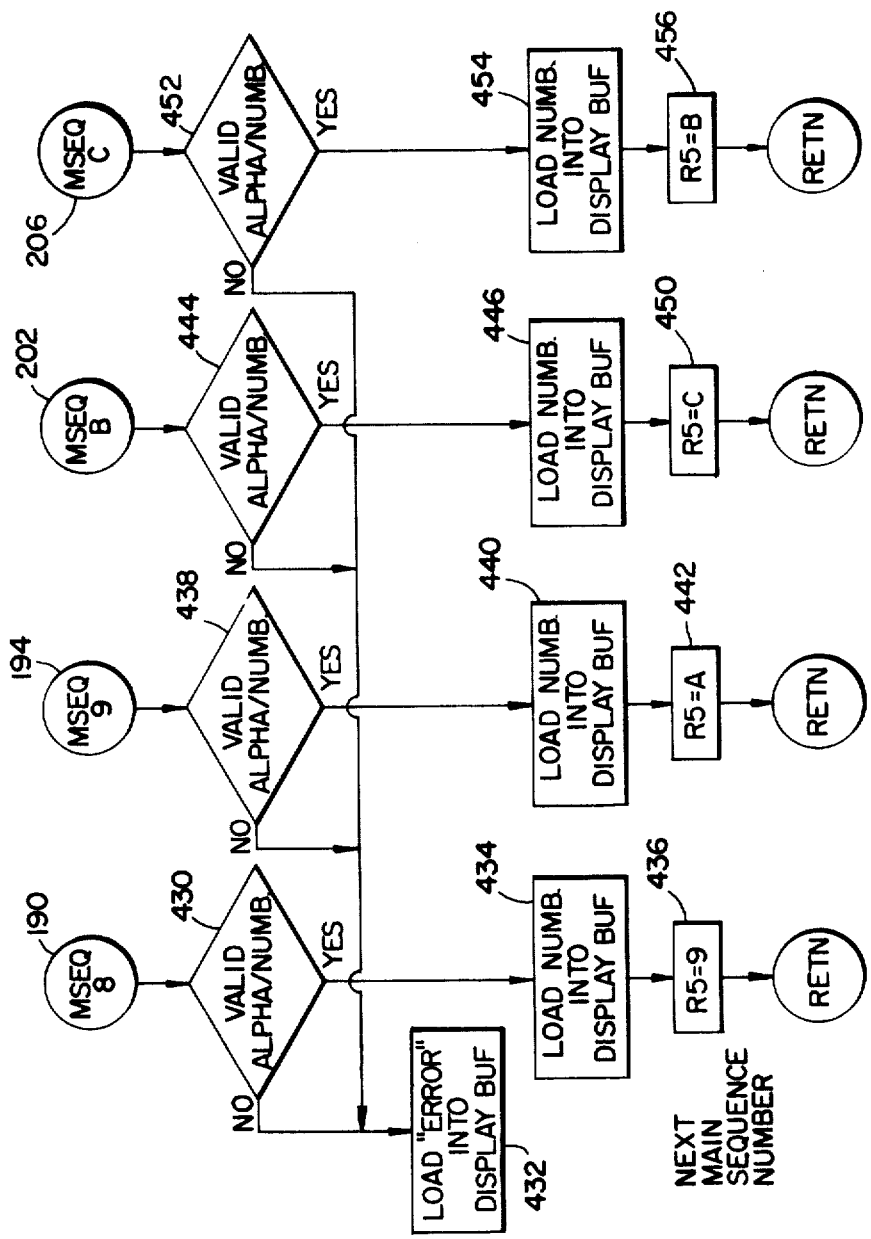
Figure 8I:
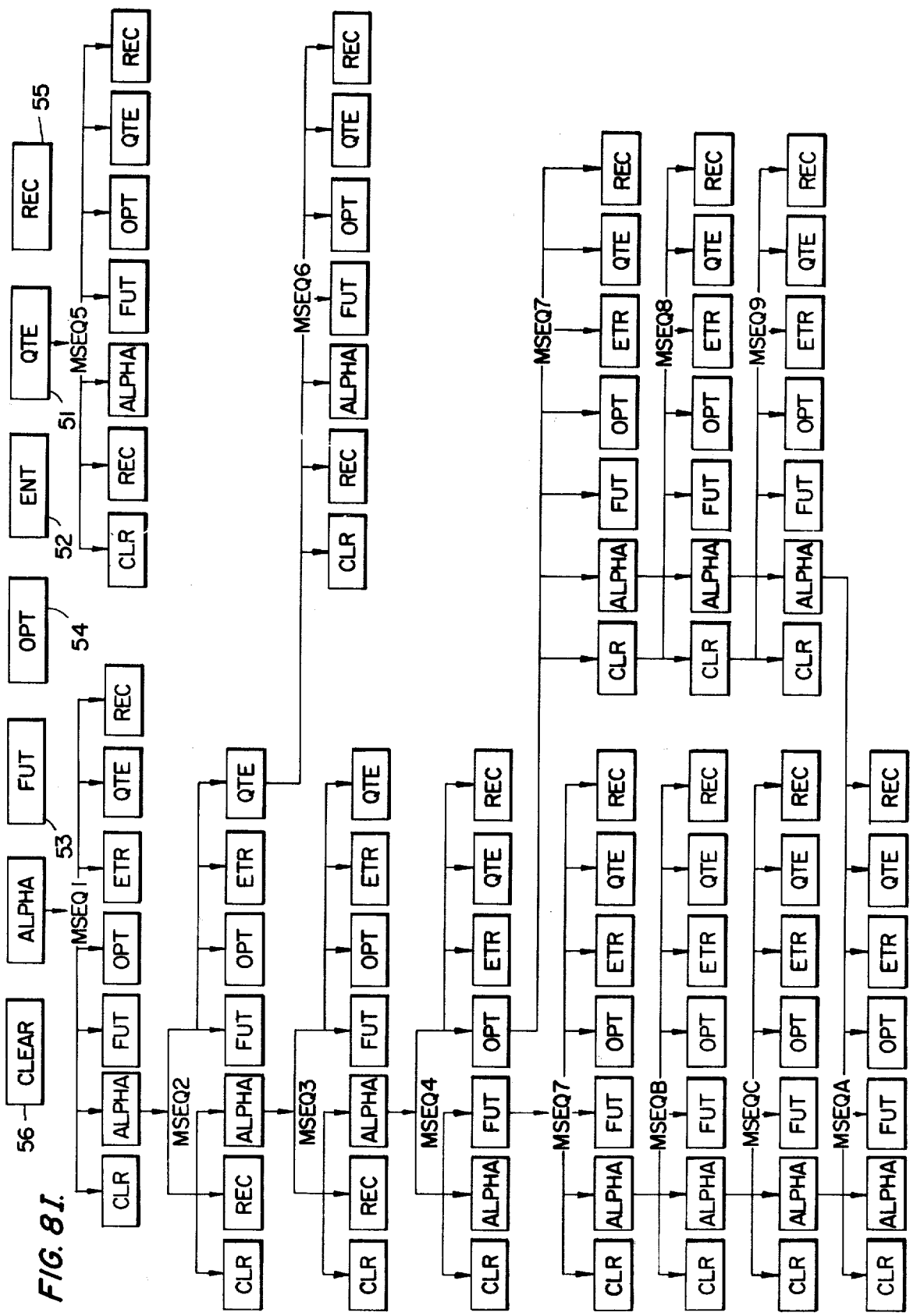

The above described sequence of key actuations "T", "ENT", and "A" is summarized in the chart shown in FIG. 8I. Starting at the top of FIG. 8I, it can be seen that there are only three valid key actuations, i.e. the actuation of an ALPHA key, the actuation of the "QTE" key 51, or the actuation of the "REC" key 55. The actuation of any of the other keys 53, 54, 52 will provide an error condition, thus causing a display of an error message upon display 32. However when an ALPHA key is pressed, the subroutine moves to the MSEQ 1 subroutine, wherein the actuation of the "ENT" key 52 causes the transfer to the subroutine MSEQ 5, and upon the subsequent actuation of an ALPHA key, there is a return to the routine MSEQ 0 to wait the entry of the next sequence of key actuations.

Next, an example of how the operator of the receiver/display device 20 accesses its RAMs 31 to obtain and display security data of American Telegraph & Telephone Company is shown in FIGS. 8A,B, & E. Upon initial actuation of the "QTE" key 51, step 164 moves to the MSEQ 0 routine 166 as shown in FIG. 8B, wherein step 210 determines that the "QTE" key 52 was depressed and moves to step 220, wherein "QTE" is disposed into the display buffer, before "5" is disposed in the R5 register by step 222 and X1 is disposed into the R4 register by step 224, before effecting a return. Upon the actuation of the second key, the subroutine moves to step 176 which examines the register R5 to find a "5" and thus calling the subroutines MSEQ 5 178 as more fully shown in FIG. 8E. Step 330 determines that an alpha key A-T is actuated and if so moves to step 332. If other than an alpha key A-T was pressed, step 337 checks if the key was an "X"; if yes, steps 139 sets or resets a news alert feature, and if no, program control continues to step 338 where the word "error" is loaded into the display buffer. The particular news alert feature which is set and reset in step 139 allows the device 20 to poll the user when a news flag is set by the data stream for a stock which has been taught to the device 20. If an alpha key A through T was pressed, step 332 examines the R4 register to determine whether there is a 0 disposed therein and if yes, the subprogram proceeds to step 358 where the device 20 is taught to receive and decode data of a particular security. If not, the program moves to step 334. Step 334 determines:whether the ticker symbol, i.e., the symbol T, is currently within the RAMs 31 and if so moves through step 334 to step 346 to determine whether the requested recommendation or quotation data is ready, i.e. whether the data had been transferred from the interface 28 to the RAMs 31. If yes, the subroutine moves to step 350 to determine whether the "QTE" key 52 or the "REC" key 55 have been pressed. If "QTE" key 52 has been depressed, the subroutine goes to step 366 wherein the desired quotation is transferred from the external RAMs 31 to display 32 for display. Thereafter, step 368 sets the R5 register to zero thereby preparing it for the next sequence of steps.

Still referring to FIG. 8E, if step 334 had determined that the ticker symbol "T" was not disposed currently in the RAMs 31, the subroutine would move to step 336, wherein the symbol "NO TEACH" is displayed before moving through step 340 to step 342, which sets R5 equal to zero and R4 equal to zero. In the instance where price data associated the Ticker symbol is not currently in memory, step 346 examines the RAMs 31 and decides "no" thus moving to step 348, which causes a display of "STANDBY" on display 32. The program loops through steps 346 and 348 until the desired piece of price data is transmitted by the data stream to the interface 28 and is transferred by the interrupt routine to the selected location within the RAMs 31, where it is recognized eventually by step 346.

Thus, it can be seen that the PROG subroutine recognizes a particular sequence of key actuations to effect a teaching of the device 20 to accept data or to provide a quotation of that data, whether that data be a stock, a future or a commodity. The MSEQ 4 subroutine as shown in FIG. 8D performs a similar function to the MSEQ 1-3 subroutines shown in FIG. 8C when the ticker symbol is four alpha characters long. When a "7" is located the R5 register after a "FUT" or "OPT" key is pressed, the PROG subroutine moves to the MSEQ 7 routine 186 as shown in FIG. 8F, which determines by step 380 whether the appropriate ALPHA key indicating whether a valid month key has been pressed and to load that month into the display buffer by step 386, before moving to the subroutines MSEQ 8 or MSEQ B as shown in FIG. 8H to perform similar functions to those of subroutine 186. Each of the MSEQ 6 through MSEQ C subroutines effects display of information relating to commodities and futures, as will be readily seen by an examination of the chart of FIG. 8I.

Figure 10A:
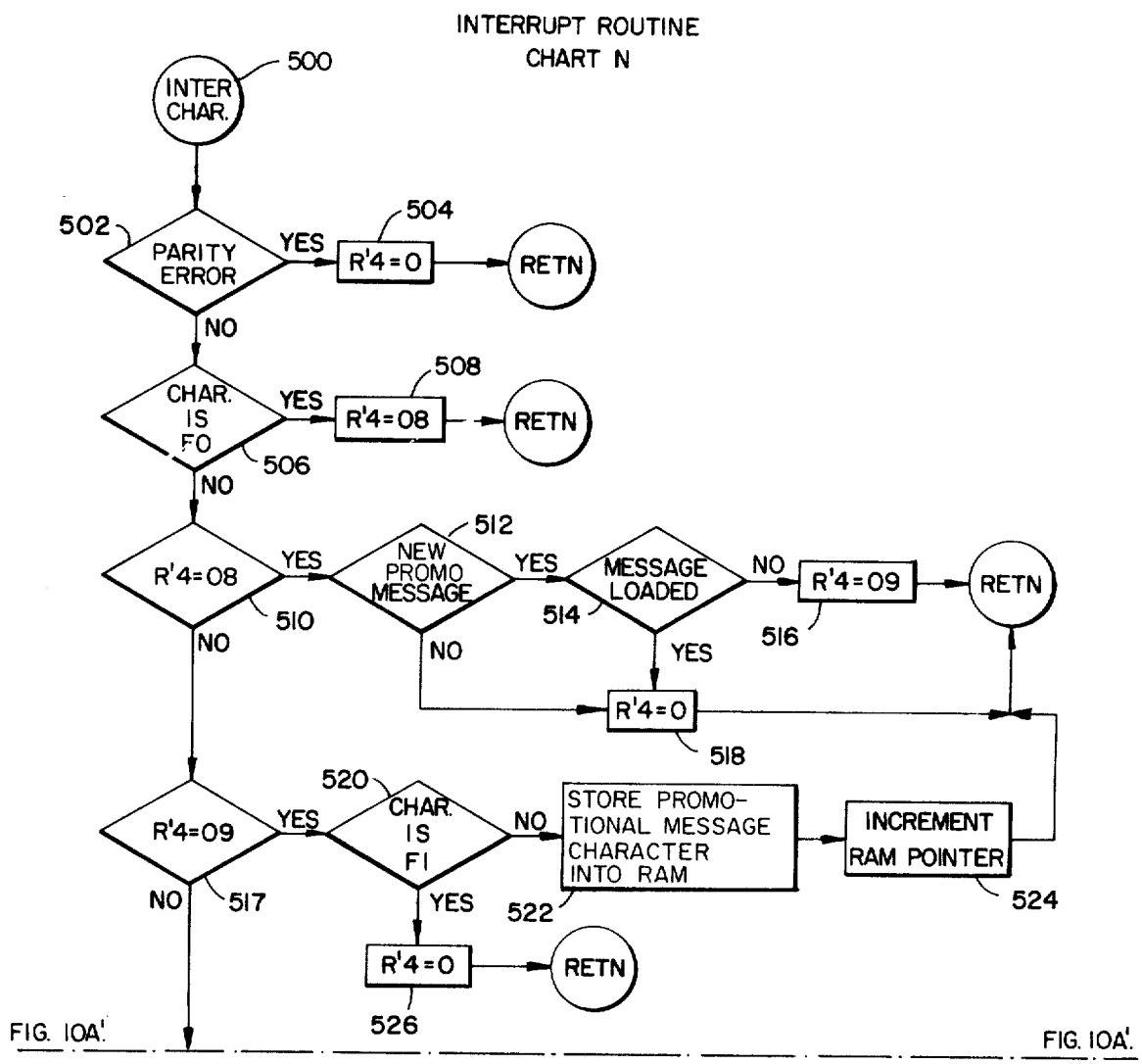

As explained generally above, the execution of the executive program is interrupted whenever a new character byte is disposed in the interface 28; in particular, the interface 28 generates a RxRDY signal that is applied to the interrupt input $\overline{INT}$ of the microcomputer 34, whereby the microcomputer 34 executes the interrupt routine as shown in detail in FIGS. 10A and B. Briefly, the interrupt routine examines each character byte as placed in the interface 28 for frame or parity error and if such an error has occurred, the entire submessage associated with that character is discarded. If no error is detected, the interrupt routine continues to examine the character byte and in particular, the manner in which it is coded to determine its type, i.e., whether the character byte is an (1) ALPHA, (2) a number, (3) a month or (4) a special. Each of the character types is encoded in a different manner, which the interrupt routine examines and in particular sorts character types and branches to subroutines depending upon the character type and the sequence in which the character bytes occur. To this end, the microcomputer 34 includes an interrupt sequence register R'4 for use in controlling the flow of the interrupt routine and in particular to store various machine states within the interrupt sequence register R'4 to indicate the past history of the sorting and branching process.

Before describing in detail the steps of the interrupt routine, a description of the various types of messages within the message block 13 of FIG. 1B to be received by the receiver/display device 20 will be given. The interrupt routine is illustratively able to analyze four distinct types of messages contained within the data stream as applied via the FM front and IF amplifier 24 and the demodulator 26 to the interface 28. Each data block 13 illustratively includes in order the following four distinct classes of messages: (1) promotional, (not shown in FIG. 1B) (2) stock 13a, (3) option 13b, and (4) future 13c. As indicated by the above sequence of messages within the data block, the promotional messages occur first and are used by the interrupt routine to initiate the examination of the remaining messages of the data stream, as will be explained. The format for the promotional message is:

| | AWY XXXX . . . . . . XXXX B |
|---|---|
| | where |
| A | is the byte representing the leader of a promotional message. This byte is coded as F0$_{16}$. |
| Y | is a byte representing the promotional message number. The hexadecimal representation and permissible message numbers are: |
| Message Number | Hexadecimal Character |
| 1 | Y = 00 |
| 2 | Y = 01 |
| 3 | Y = 02 |
| 4 | Y = 04 |
| 5 | Y = 08 |
| 6 | Y = 18 |
| 7 | Y = 28 |
| 8 | Y = 48 |
| 9 | Y = 88 |
| W | is a byte containing the class of the message i.e. all subscribers or only subclasses. There are 16 classes. |
| XXXX . . . | are up to 64 characters in ASCII representation which form the promotional message. |
| Z | is a byte containing the subscription key coded to match the current key on the subscription card. |
| B | is the byte representing the end character of a promotional message. This byte is coded as F1$_{16}$. |

In an illustrative embodiment of the data block 13, the promotional message occurs first, followed in order by the stock message 13a, option message 13b and future message 13c, whose formats have been set out above. As indicated above, the special byte W is compared with the number preset in the classifier 41 to determine whether a particular promotional message will be received and displayed.

Upon the entry of a new character into the interface 28, the microcomputer 34 effects an entry into the interrupt routine via the entering point 500; a further embodiment of the interrupt routine being shown in FIGS. 10A and B. The interrupt routine examines each incoming character byte from the FM front end and IF amplifier 24 for a hexadecimal F$\phi$, which character indicates the beginning of a new data block 13 and in particular, the beginning of a promotional message which is the first message in each data block 13. Each character byte is examined in step 502 to determine if there is a parity error and if there is an error, that character byte is discarded and the interrupt sequence register R'4 is reset to zero by step 504, i.e. the initial condition, and a return is made to the executive program as shown in FIG. 7. Next, step 506 examines each character byte to determine if the character byte is coded as F0 and if yes, the sequence register R'4 is set to 8 indicating that the leading character or leader of a promotional message has been detected. Now that the interrupt sequence register R'4 has been set to a value other than zero, the interrupt routine moves to step 510, which now recognizes whether an 8 has been set in the sequence register R'4 and if yes, step 512 determines whether the promotional message is a new message or not, and whether the class of the message matches the class of the device 20 as preset by the classifer 41. If yes, step 514 determines whether that message has been loaded into a designated location of the RAMs 31. If no, step 516 sets the interrupt sequence register R'4 to 9, before a return is effected. If either step 512 or 514 determines that the promotional message is not new or that the message has been loaded, step 518 sets the interrupt sequence register R'4 to zero before effecting a return.

Next, step 517 determines whether the promotional message has been loaded by examining the interrupt sequence register R'4 to determine whether a 9 is loaded therein and if yes, the routine moves to step 520, where a determination is made of whether the character is a hexadecimal F1 indicating the end of the promotional message. If it is the end of the promotional message, the interrupt routine moves to step 526 to set the interrupt sequence register R'4 to 0 before effecting a return. If no, step 522 stores the promotional character into a selected location of the RAMs 31 before incrementing the RAM pointer by step 524, the RAM pointer being a register or storage location within the microcomputer 34 addressing the location within the RAMs 31 where the promotional message character is stored. Thereafter, a return is effected. In this manner, each of the 64 characters of the promotional message and the three characters comprising the message class, the key word and the message number, are loaded into the RAMs 31, until the end of character message F1 is sensed, and the interrupt sequence register R'4 is set to advance the interrupt routine to the next sequence of inquiries Next, if an end of promotional message has been sensed as indicated by storing a zero in the interrupt sequence register R'4, the interrupt routine moves to step 532, which clears the ticker buffer, a set of registers of memory locations within the microcomputer 34. After clearing, step 534 examines the hexidecimal code of the character stored to determine whether it is an alpha character and if yes, step 536 stores the character in the ticker buffer and sets the interrupt sequence register R'4 to 1 before effecting a return. The interrupt routine will continue to loop returning to step 538 which examines the interrupt sequence register R'4 to determine that a 1 is set therein and if so moves again to steps 534 and 536 wherein alpha characters are stored in the ticker buffer.

If step 534 determines that the character byte under consideration is not an alpha character, the interrupt routine moves to step 562, which again examines the interrupt sequence register R'4 to determine if an 0 is set therein and if yes, a return is effected. If no, step 564 again looks at the hexadecimal code of the character byte to determine whether it is a number and if yes, indicating that all the alpha characters corresponding to a ticker symbol have been entered into the ticker buffer, step 566 matches the stored ticker symbol with the ticker symbols as stored in locations A through T of the RAMs 31 to determine whether the device 20 has been "taught" or "encoded" to update data corresponding to that security. Step 566 is a search routine that examines the data field of the RAMs 31, as set out above. The search routine 566 first compares the first alpha character of the ticker symbol stored in the ticker buffer with the character at the first row and column of the RAM data field. If a match is made with a character in the first column, a match is sought with the second character as found in the second column of the RAM data field. The search routine seeks a comparison and proceeds from location to location within the columns and rows of the RAM data field by incrementing the absolute address of the first location within the RAM data field to address successively each of the 20 memory locations to determine whether a match is made. Step 568 determines whether a match occurs between the ticker symbol as stored in the ticker buffer and the dedicated location of the RAMs 31 and if yes, moves to step 570 which examines a main sequence operational code indicating which of the data messages is being operated on i.e. whether a stock, option or future message. In particular, step 570 determines that even if a ticker symbol match has been obtained, whether there is also a correspondence with the type of data message, i.e. stock, option or future. If step 570 determines a match has been made with the main sequence operational code, step 572 increments the machine status stored in the interrupt sequence register by 3. Thereafter, step 574 loads the price data as obtained from that portion of the stock message 13a into a selected location of the locations A to T within the RAMs 31, before effecting a return. If the decisions made in steps 568 and 570 are no, the routine moves to step 576 which sets the interrupt sequence register R'4 to 7 before effecting a return. As can be seen by a further examination of the interrupt routine as seen in FIGS. 10A and B, the loading of a machine state 7 into the interrupt sequence register prepares the interrupt routine in most instances to discard the initially examined data if there is no match of the ticker symbol or if there is no match of the main sequence operational codes as determined respectively by steps 568 and 570, before reinitializing the system to examine the next character byte.

If step 564 determines that the next character is not a number, the interrupt routine moves to step 578 where a determination is made as to whether the character is a month type of character as would be used in messages relating to futures or options; if yes, step 580 transfers the content of the register R6 within the microcomputer 34 to its R32 register and sets the sequence interrupt register R'4 to C3 indicating that a future message is to be analyzed, before effecting a return. If the character is not a month type character, the routine moves to step 584, where the character is examined to determine whether it is an option and if yes, step 582 sets the interrupt sequence register R'4 to 83 indicating that an option message is to be analyzed in the subsequent steps of the interrupt routine, before effecting a return.

Figure 10B:
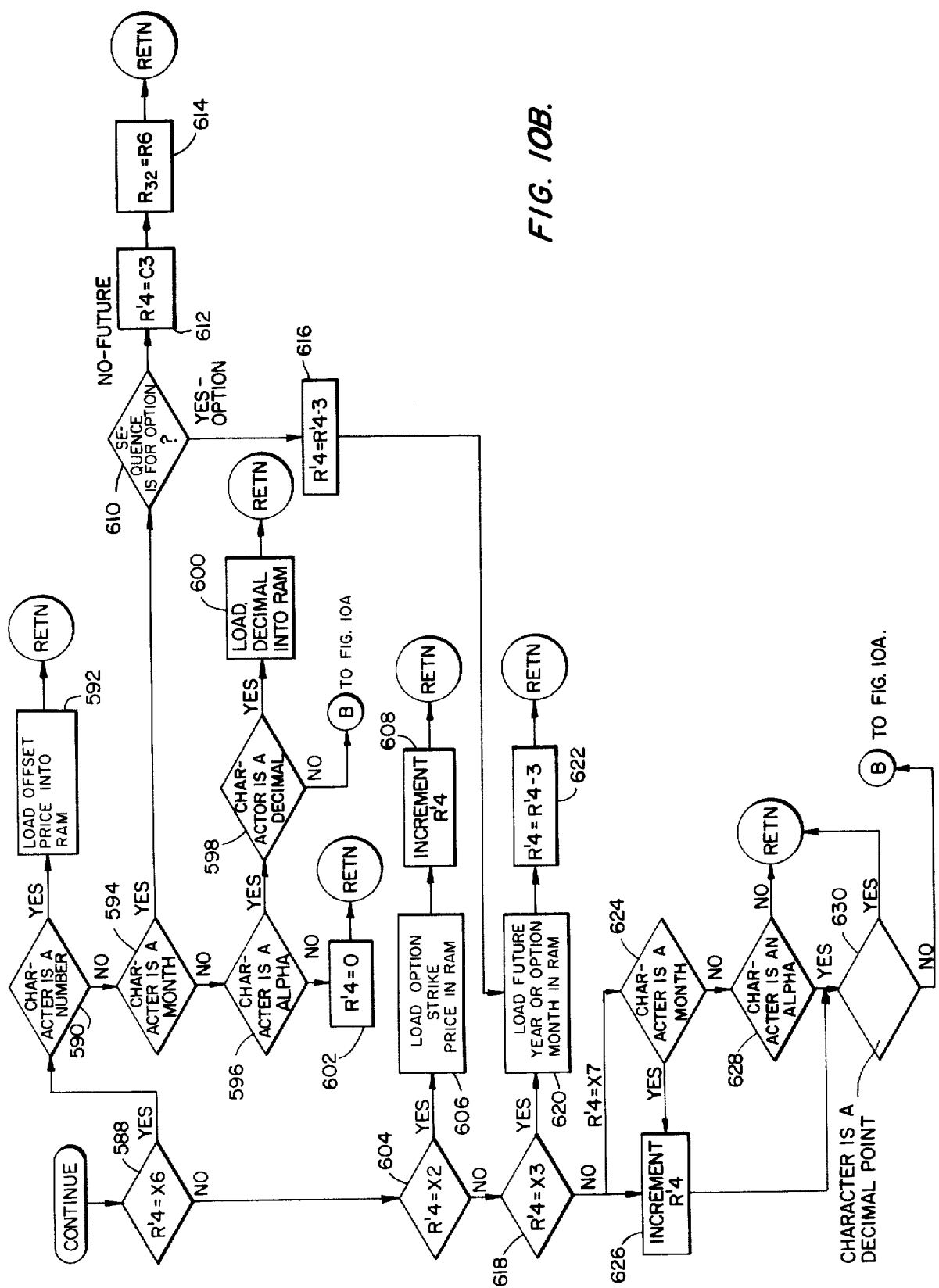

From the above, it is seen that key steps of the interrupt routine determine whether the incoming message is one relating to stocks 13a, options 13b or futures 13c and whether the information within the incoming messages is a ticker symbol, a price or a recommendation. In particular, the type of message is determined by examining the sequence of and type of each character byte to determine whether it is an alpha, number, month or option. Thus the interrupt routine can identify the type of message by the sequence of such characters and set the interrupt sequence register to a machine state i.e. a two digit number to identify the particular type of message that is being analyzed. The remaining steps of the interrupt routine as seen in FIGS. 10A and B process the information as conveyed by a message once it has been identified. For example, step 540 determines whether the least significant nibble of the hexadecimal number as stored within the interrupt sequence register R'4 is a 4 and if so, determines as by steps 542, 546 and 552 whether the character under consideration is a number, a recommendation or a decimal point, respectively. In similar fashion, step 556 looks at the least significant nibble of the machine state number as stored within the interrupt sequence R'4 to effect by steps 558, 562 and 568 a determination of whether the character is a recommendation, a number or an alpha, respectively. As shown in FIG. 10B, steps 588, 604 and 618 further examine the least significant digit of the machine state number as stored within the interrupt sequence register to load data relating to option and future messages 13b and c into the RAMs 31. The following chart provides an indication for each of the future, option and stock messages of the corresponding machine state numbers as stored in the interrupt sequence register R'4:

| | | | | | | | | | | | | | | | | | | | | |
|---|---|---|---|---|---|---|---|---|---|---|---|---|---|---|---|---|---|---|---|---|
| STOCKS | R'4 in | 0 | 1 | 1 | 1 | 1 | 44 | 44 | 45 | 45 | 45 | 45 | 46 | 46 | 46 | 1 | 1 | ... | | |
| | Message | A | B | C | D | $X_1$ | $X_2$ | $\eta$ | $\xi$ | $\gamma$ | $\gamma$ | $Y_1$ | $Y_2$ | $Y_3$ | D | E | F | ... | | |
| | R'4 out | 1 | 1 | 1 | 1 | 44 | 44 | 45 | 45 | 45 | 45 | 46 | 46 | 46 | 1 | 1 | 1 | ... | | |
| OPTIONS | R'4 in | 0 | 1 | 1 | 1 | 1 | 82 | 83 | 81 | 84 | 84 | 85 | 86 | 86 | 86 | 81 | 84 | 84 | 85 | 86 | ... |
| | Message | A | B | C | D | B0 | S | i | $X_1$ | $X_2$ | $\eta$ | $Y_1$ | $Y_2$ | $Y_3$ | j | $X_1$ | $X_2$ | $\eta$ | $Y_1$ | $Y_2$ | ... |
| | R'4 out | 1 | 1 | 1 | 1 | 82 | 83 | 81 | 84 | 84 | 85 | 86 | 86 | 86 | 81 | 84 | 84 | 85 | 86 | 86 | ... |
| FUTURES | R'4 in | 0 | 1 | 1 | 1 | 1 | C3 | C1 | C4 | C4 | C4 | C5 | C6 | C6 | C6 | C6 | C6 | C6 | C3 | C1 | C4 ... |
| | Message | A | B | C | D | i | R | $X_1$ | $X_2$ | $X_3$ | $\eta$ | $Y_1$ | $Y_2$ | $Y_3$ | $Y'_1$ | $Y'_2$ | $Y'_3$ | j | R | $X_1$ | $X_2$ ... |
| | R'4 out | 1 | 1 | 1 | 1 | C3 | C1 | C4 | C4 | C4 | C5 | C6 | C6 | C6 | C6 | C6 | C6 | C3 | C1 | C4 | C4 ... |

From observation of the above chart, it is seen how the interrupt routine successively analyzes each character byte of a message and uses the machine state word as disposed within the interrupt sequence register to load the transmitted data into an addressable location within the RAMs 31.

Thus, there has been described above, apparatus for receiving a continuously transmitted stream of data, each transmission of the data being updated to reflect current data as that data changes. Such apparatus has particular utility with the transmission and reception of data relating to securities such as stock, future and commodity prices. The receiver/display device of this invention includes means for receiving and demodulating the signal such as an FM tuner and applies the received stream of data to an interface that permits an examination of each successive character byte of the stream of data to determine whether it is of a particular type e.g. an alpha character and whether that character satisfies its error parity code; if not, that character is discarded. In a further feature, one or more of the characters as would illustratively identify a particular security for example in the form of a ticker symbol, is stored in a temporary register and compared with similar ticker symbols as stored within the system's memory. If a match there between is recognized, the data previously stored is updated with the new data as transmitted. In this manner, data as related to securities may be continuously updated as to its current price as obtained from the exchange. In a further aspect of this invention relating to the computer configuration, the interface upon the reception of each character byte provides an interrupt signal to the microcomputer or processor whereby the microcomputer's executive program is interrupted to examine that character byte and to decide whether to retain or to discard that character byte. In a further aspect of this invention, the device includes a keyboard whereby the device's operator may teach the device to receive data and to display data as now received and currently stored within the device. To this end, the keys of the keyboard have plural functions depending upon the sequence of key actuation. For example, a key may indicate either a number or an alpha character.

While not believed necessary for a thorough understanding of the present invention, submitted herewith and made a permanent part of the file wrapper of this application is a computer program listing showing how a conventional computer, e.g. the microcomputer 34, may be programmed to effect the various functions of the above described circuitry and to execute the executive interrupt and other routines as described above. To the extent that this material is deemed by the Examiner to be necessary under the provisions of Section 112 of the Patent Laws, it is incorporated herein by reference.

In considering this invention it should be remembered that the present disclosure is illustrative only and the scope of the invention should be determined by the appended claims.

I claim:

1. Apparatus for receiving an encoded data stream comprising a plurality of data groups as transmitted from a remote location and for selectively accessing the received data stream to sort out and store only those data groups of interest, each data group of the encoded data stream includes its unique identifying word, the encoded data stream includes a classifier manifestation indicative of a protected data group, said apparatus comprising:
   (a) decoder means for receiving and decoding the transmitted, encoded data stream;
   (b) temporary storage means coupled to said decoder means for sequentially receiving and temporarily storing, one at a time, at least said identifying word of each received and decoded data group of the data stream;
   (c) updateable, addressable memory means for storing a plurality of those data groups of interest and their identifying words at corresponding, addressable locations therein; and
   (d) control means comprising comparing means coupled to said temporary storage means and said updateable, addressable memory means for accessing the identifying word currently stored in said temporary storage means and each of said identifying words of the data groups of interest and for comparing the temporarily stored, current identifying word with each of the identifying words of the data groups of interest, updating means responsive to said comparing means and operative in a first mode, between the currently stored identifying word and one of the identifying words of the data groups of interest for effecting the storage of the data group corresponding to the currently stored identifying word in that location of said updateable, addressable memory means in place of the previously stored group of interest corresponding to the one matched identifying word, and in a second mode if a match is not made between the groups of interest to discard from said temporary storage means the received and decoded data group, and classifier means settable with a classifier manifestation means for effecting a comparison of the transmitted classifier manifestation of the data stream and the set classifier manifestation and, if a comparison is made therebetween, for accessing and transfering the protected data group to said temporary storage means and, if a comparison is not made therebetween, for discarding the protected data group.

2. The apparatus as claimed in claim 1, wherein the encoded data stream is continuously transmitted to said apparatus and comprises a number N of distinct data groups, said memory means comprising a number M of addressable locations for storing a corresponding number of data groups, said number M being less than said number N.

3. The apparatus as claimed in claim 2, wherein there is included keyboard means comprising a plurality of actuatable keys, said data groups being of a plurality of different message types, and key sequence recognition means coupled to said keyboard means and responsive to the sequence of actuation of said keys to identify the message type of the data group to be processed.

4. The apparatus as claimed in claim 3, wherein said keyboard means functions in at least a first mode, wherein M keys of said plurality of keys are dedicated to corresponding of said M distinct locations of said updateable, addressable memory means, and a second mode, wherein said plurality of keys effects entry of alpha/numeric data, said keyboard means including a first key for disposing said keyboard means to said first mode, and said key sequence recognition means responsive to the actuation of said first key and to a selected one of said M keys for actuating said accessing means to access a corresponding one of said M addressable locations, whereby a data group is transferred thereto.

5. Apparatus as claimed in claim 4, wherein there is included display means coupled to said updateable, addressable memory means, said keyboard means includes a second key actuatable to dispose said keyboard means to its first mode and said key sequence recognition means responsive to the actuation of said second key and a selected one of said M keys for actuating said accessing means to address a corresponding one of said M distinct locations of said addressable memory to effect a transfer of the corresponding data group from the addressed location of said addressable memory means to be displayed by said display means.

6. The apparatus as claimed in claim 5, wherein said keyboard means includes third and fourth keys respectively actuatable to disposed said keyboard means to its first mode to effect the dedication of a location within said addressable memory means to a first type of message and a second type of message, and said key sequence recognition means responsive to the actuation of each of said third and fourth keys for actuating said accessing means to address the dedicated location of said memory and for effecting a transfer and storage of each of the data groups of said first and second types to its corresponding dedicated location within said addressable memory means.

7. The apparatus as claimed in claim 5, wherein there is included display means for displaying data as obtained from a selected one of the data groups in said addressable memory means, said key sequence recognition means responsive to a given sequence of key actuations to actuate said access means to transfer a selected data group as stored in said addressable memory means to be displayed by said display means.

8. The apparatus as claimed in claim 2, wherein there is included display means coupled to said addressable memory means for selectively displaying a data group as stored in said addressable memory means.

9. The apparatus as claimed in claim 8, wherein there is included keyboard means coupled to said addressable memory means and said display means for selectively entering the identifying words of the data groups of interest to be stored within said M locations of said addressable memory means and for selectively transferring a data group from a selected one of said M locations of said addressable memory means to be displayed by said display means.

10. Apparatus as claimed in claim 1, wherein said comparing means is coupled to said decoder means for effecting a comparison of the transmitted classifier manifestation as decoded by said decoder means.

11. The apparatus as claimed in claim 1, wherein there is included display means coupled to said updateable, addressable memory means for selectively displaying the accessed protected data group.

12. The apparatus as claimed in claim 1, wherein said settable means comprises a plurality of switches presettable to provide the classifier manifestation.

13. The apparatus as claimed in claim 1, wherein there is included interface means, each of the data groups comprising a plurality of data characters, said interface means being coupled to said decoder means for receiving and temporarily storing one at a time a data character.

14. The apparatus as claimed in claim 13, wherein there is included examining means coupled to said interface means for examining the sequence of the bits of each data character to determine the validity of each data character and, if invalid, for discarding that invalid data character.

15. The apparatus as claimed in claim 14, wherein each of the identifying words comprises data characters of a specially encoded type, said examining means examining each data character in said interface means and if of the specially encoded type, for transferring said specially encoded data character to said temporary storage means.

16. The apparatus as claimed in claim 15, wherein therein is included a microcomputer having a plurality of address signal outputs and a plurality of data signal bidirectional terminals, said microcomputer being responsive to instruction signals at said data signal terminals for performing arithmetic and logic operations on the data to generate output data signals at said data signal terminals and address signals at said address signal outputs, and at least one read only memory having a plurality of address signal inputs and a plurality of data signal outputs, said read only memory storing a first executive program and a second interrupt program, said addressable memory means comprising at least one random access memory having a plurality of address signal inputs and a plurality of data signal outputs, address bus means comprising an address bus for interconnecting said microcomputer address signal outputs to said read only memory address signal inputs and to said random access memory signal inputs, and data bus means for connecting said microcomputer data signal terminals to said read only memory data signal outputs and to said random access memory data signal outputs, said read only memory being responsive to said address signals at its address signal inputs for generating instruction signals at its data signal outputs.

17. The apparatus as claimed in claim 16, wherein said second interrupt program as stored within said read only memory is an interrupt routine and effects the functions of said examining means, said microcomputer comprising an interrupt input coupled to said interface means, said interface means responsive to the disposition of each data character therein for providing an output to said microcomputer to effect a jump to said second interrupt routine.

18. The apparatus as claimed in claim 17, wherein said first executive program includes an analysis routine for effecting the functions of said sequence means.

19. The apparatus as claimed in claim 18, wherein said second interrupt routine effects the functions of said comparing means.

20. The apparatus as claimed in claim 19, wherein said temporary storage means comprises a selected, addressable location within said random access memory.

21. The apparatus as claimed in claim 1, wherein each data group of said data stream comprises a series of data characters, said data characters of each data group being encrypted by selectively reordering the sequence of the data characters, wherein there is included de-encryption means coupled to receive the transmitted data stream and for reordering the sequence of the data characters of each data group in an inverse sense to de-encrypt the transmitted data streams, said de-encryption means coupled to said decoder means to provide the de-encrypted data stream thereto.

22. The apparatus as claimed in claim 21, wherein said de-encryption means is adapted to receive a card, said card including a de-encryption manifestation for determining the reordering of said data characters of said data stream.

23. The apparatus as claimed in claim 22, wherein said de-encryption means comprises a source of radiation of a given wavelength for scanning said card, and means disposed to receive the radiation from said card for providing an output indicative of the radiation from said card, and said card comprises first and second regions, said first region being reflective to said radiation of given wavelength and said second region being nonreflective to said given wavelength, said first and second regions being configured and disposed with respect to each other in a manner to provide an output from said radiation sensitive means indicative of the reordering of said data characters of said data group to de-encrypt its message.

24. The apparatus as claimed in claim 23, wherein said given wavelength is in the order of 850nm and said first portion is dyed with a Naphthol Green dye and said second portion is dyed with a Brilliant Green dye.

25. The apparatus as claimed in claim 22, wherein said de-encryption means comprises a source of radiation of a given wavelength outside of the visual range for scanning said card, and means disposed to receive the radiation from said card for providing an output indicative of the radiation from said card, and said card comprises first and second regions, said first region being reflective to said radiation of said given wavelength and said second region being nonreflective to said given wavelength, said first and second regions being similarly reflective to radiation within the visual range, said first and second regions being configured and disposed with respect to each other in a manner to provide an output from said radiation sensitive means indicative of the reordering of said data characters of said data group to de-encrypt its message.

26. The apparatus as claimed in claim 1, wherein said data stream includes an access manifestation and there is further included access means coupled to said decoder means for receiving a card bearing an access manifestation, and means for comparing the transmitted access manifestation with the card's access manifestation and if a match is made, to permit said decoder means to receive said data stream.

27. The apparatus as claimed in claim 26, wherein said access means comprises temporary storage means for receiving the access manifestation from the card and second comparing means for effecting a comparison between the card's access manifestation and that of the transmitted data stream and if a comparison is made, for receiving the data stream and if the comparison is not made, for disregarding the data stream.

28. The apparatus as claimed in claim 26, wherein said card comprises first and second surfaces, first and second plurality of conductors disposed upon said first and second surfaces respectively, and interconnection means made between selected of said conductors of said first and second pluralities of conductors in a manner to provide the desired reordering of the data characters of said data stream.

29. The apparatus as claimed in claim 26, wherein said access means comprises a source of radiation of a given wavelength for scanning said card, means disposed to receive the radiation from the said card for providing a signal indicative of the radiation from said card, said card having a first layer with portions thereof modulating the radiation of a given wavelength as it passes to said sensing means and configured to provide the signal indicative of the access manifestation, and a second layer disposed over said first layer and being transmissive to the radiation of a given wavelength and being nontransmissive to radiation within the visual range.

30. The apparatus as claimed in claim 26, wherein said access means comprises a source of radiation of a given wavelength outside of the visual range for scanning said card, and means disposed to receive the radiation from said card for providing an output indicative of the radiation from said card, and said card comprises first and second regions, said first region being reflective to said radiation of given wavelength and said second region being nonreflective to said given wavelength, said first and second regions being similarly reflective to radiation within the visual range, said first and second regions being configured and disposed with respect to each other in a manner to provide an output from said radiation sensitive means indicative of said access manifestation to permit, if a match is made, said apparatus to receive said data stream.

31. Apparatus for receiving and processing transmitted blocks of data, each data block including an access manifestation whereby said apparatus may gain access to said data block, said apparatus comprising:
(a) decoder means for receiving and decoding said encoded data blocks;
(b) temporary storage means coupled to said decoder means for receiving and temporarily storing at least said access manifestation of each incoming data block;
(c) processor means for selectively processing said data blocks; and
(d) access means comprising means for receiving a card having an access manifestation thereon to provide a signal indicative of the card's access manifestation, means coupled to said temporary storage means and to said card receiving means for accessing the access manifestation of the incoming data block and the card's access manifestation signal, means coupled to said accessing means and said receiving means for comparing the card's access manifestation signal with the transmitted access manifestation, and data transfer means coupled to said decoder means and to said processor means and responsive to said comparing means and operable in a first mode if a match exists between the access manifestation of the incoming data block and the card's access manifestation signal for transferring the incoming data block to said processor means for further processing, and in a second mode if a match is not made between the access manifestation of the incoming data block and the card's access manifestation signal, to discard the incoming data block from said temporary storage means.

32. A process for repetively transmitting a first number of updated data groups from a central location to a plurality of locations remote from said central location, each data group indicative of a changing item, said transmitting process comprising the steps of:
(a) establishing a storage file of said first number of data groups;
(b) continuously monitoring the changing items to provide and store an updated data group in said storage file in place of the corresponding, former data group;
(c) assigning to each data group a unique word identifing its item;
(d) repetively transmitting from said central station one of said plurality data groups at a time;
(e) receiving at each of said remote locations said plurality of repetively transmitted data groups;
(f) identifying at each of said remote locations a second number of items of interest less than said first number of data groups;
(g) comparing at each remote location said identifying word of each received data group to said identifying word of each item of interest to provide a set of updated data groups of interest at each remote location.

33. The repetively transmitting process of claim 32, wherein the items change randomly, and said first number of data groups is transmitted repetively at a given rate to provide a set of updated data groups with a corresponding degree of timeliness.

34. The repetively transmitting process of claim 32, wherein there is further included the step of storing said set of updated data groups in an addressable file at each remote location.

35. The repetively transmitting process of claim 34, further including the step of addressing at each remote location said addressable file a data group corresponding to a selected one of said items of interest.

36. The repetively transmitting process of claim 32, wherein each of said first number of data groups is disposed in a given order in said storage file to permit storage of an updated data group into said ordered storage file in place of the corresponding, former data group.

37. The repetively transmitting process of claim 32, wherein each item is a security and its updated data group is indicative of its current price.

38. The repetively transmitting process of claim 32, wherein each first number of updated data groups includes a classifier manifestation indicative of at least one protected data group within said first number, repetively transmitting said first number of updated data groups with its classifier manifestation, providing to each remote location a classifier manifestation, and effecting a comparison of the transmitted classifier manifestation with the provided classifier manifestation and, if a match is made therebetween, for permitting access to the transmitted protected data group.

39. The repetively transmitting process of claim 32, including the steps of periodically assigning to each first number of updated data groups an access manifestation, repetively transmitting said first number of updated data groups and its access manifestation to each of the remote locations, providing an access manifestation to selected of said remote locations and comparing said provided access manifestation with said transmitted access manifestation and, if there is a match, therebetween permitting access to said transmitted first number of updated data groups.

* * * * *